United States Patent
Tamura et al.

[11] Patent Number: 5,988,137
[45] Date of Patent: Nov. 23, 1999

[54] CONTROLLER OF IN-CYLINDER INJECTION SPARK IGNITION INTERNAL COMBUSTION ENGINE

[75] Inventors: Hiroki Tamura; Kazuchika Tashima, both of Tokyo, Japan

[73] Assignee: Mitsubishi Jidosha Kogyo Kabushiki Kaisha, Tokyo, Japan

[21] Appl. No.: 09/066,438

[22] PCT Filed: Aug. 27, 1997

[86] PCT No.: PCT/JP97/02982

§ 371 Date: Apr. 28, 1998

§ 102(e) Date: Apr. 28, 1998

[87] PCT Pub. No.: WO98/09062

PCT Pub. Date: Mar. 5, 1998

[30] Foreign Application Priority Data

Aug. 28, 1996 [JP] Japan ................................ 8-226568

[51] Int. Cl.[6] ........................................... F02B 17/00
[52] U.S. Cl. ........................................... 123/295; 123/430
[58] Field of Search ................................ 123/295, 430

[56] References Cited

U.S. PATENT DOCUMENTS

| | | | |
|---|---|---|---|
| 5,313,920 | 5/1994 | Matsushita | 123/295 |
| 5,870,992 | 2/1999 | Kamura et al. | 123/305 |
| 5,873,344 | 2/1999 | Kudou et al. | 123/295 |
| 5,875,756 | 3/1999 | Kamura et al. | 123/305 |
| 5,878,711 | 3/1999 | Kamura et al. | 123/295 |

FOREIGN PATENT DOCUMENTS

| | | |
|---|---|---|
| 4110618 A1 | 10/1991 | Germany . |
| 4112574 A1 | 10/1991 | Germany . |
| 59-10862 | 1/1984 | Japan . |
| 61-157760 | 7/1986 | Japan . |
| 3281965 | 12/1991 | Japan . |
| 4228856 | 8/1992 | Japan . |
| 4237854 | 8/1992 | Japan . |
| 512537 | 2/1993 | Japan . |
| 5118244 | 5/1993 | Japan . |
| 799105 | 10/1995 | Japan . |
| 799114 | 10/1995 | Japan . |
| 7293260 | 11/1995 | Japan . |
| 8170556 | 7/1996 | Japan . |
| 8189405 | 7/1996 | Japan . |
| 9126028 | 5/1997 | Japan . |
| 9177582 | 7/1997 | Japan . |
| 9268942 | 10/1997 | Japan . |

*Primary Examiner*—John Kwon

[57] ABSTRACT

A control apparatus for a cylinder-injection spark-ignition internal combustion engine switches control mode in accordance with an engine operating state between compression stroke injection mode control, in which fuel is injected during the compression stroke to achieve stratified combustion, and suction stroke injection mode control, in which fuel is injected during the suction stroke to achieve uniform mixture combustion. Where regular gasoline lower in octane number than premium gasoline is used, a target mean effective pressure ($P_e$), which is set in accordance with throttle opening ($\theta_{th}$), is subjected to octane number-based correction to thereby compensate for an engine output change at the mode switching, whereby a torque shock at the time of mode switching is prevented.

6 Claims, 14 Drawing Sheets

| Ne / θth | N1 | N2 | • • • • | Nj-1 | Nj |
|---|---|---|---|---|---|
| $\theta_1$ | $P_{eB11}$ | $P_{eB12}$ | • • • • | $P_{eB1j-1}$ | $P_{eB1j}$ |
| $\theta_1$ | $P_{eB21}$ | $P_{eB22}$ | • • • • | $P_{eB2j-1}$ | $P_{eB2j}$ |
| ⋮ | ⋮ | ⋮ | • • • • | ⋮ | ⋮ |
| $\theta_{i-1}$ | $P_{eBi-11}$ | $P_{eBi-12}$ | • • • • | $P_{eBi-1j-1}$ | $P_{eBi-1j}$ |
| $\theta_i$ | $P_{eBi1}$ | $P_{eBi2}$ | • • • • | $P_{eBij-1}$ | $P_{eBij}$ |

CONTROLLER OF IN-CYLINDER INJECTION SPARK IGNITION INTERNAL COMBUSTION ENGINE

This application claims the benefit under 35 U.S.C. §371 of prior PCT International Application No. PCT/JP97/02982, which has an International filing date of Aug. 27, 1997, which designated the United States of America, the entire contents of which are hereby incorporated by references.

TECHNICAL FIELD

The present invention relates to a control apparatus for controlling a cylinder-injection spark-ignition internal combustion engine, and more particularly, to a control apparatus for minimizing deterioration in drivability or fuel efficiency when a change occurs in the values of parameters that are related to the occurrence of knocking, such as the properties of fuel supplied to the engine.

BACKGROUND ART

In order to reduce harmful exhaust gas components or improve the fuel efficiency of a spark-ignition internal combustion engine mounted on a vehicle, there have recently been proposed various types of cylinder-injection gasoline engines, in which fuel is injected directly into the combustion chamber, in place of conventional manifold-injection engines.

In cylinder-injection gasoline engines, fuel is injected from a fuel injection valve to, for example, a cavity formed on the top of a piston so that, at the time of ignition, an air-fuel mixture having an air-fuel ratio close to the stoichiometric air-fuel ratio may be produced around the spark plug. This permits firing even with an air-fuel mixture, which is lean as a whole, thereby reducing the emission amounts of CO and HC, and also greatly improves the fuel efficiency during idling or low-load travel.

In this type of gasoline engine, moreover, injection mode is switched between a compression stroke injection mode and a suction stroke injection mode in accordance with an operating state of the engine, that is, engine load. Specifically, during a low-load operation, the compression stroke injection mode in which fuel is injected mainly during the compression stroke is selected to produce a mixture with an air-fuel ratio close to the stoichiometric air-fuel ratio locally around the spark plug or in the cavity, so that satisfactory stratified combustion may take place even with an air-fuel mixture, which is lean as a whole (this injection mode is referred to as compression-lean mode). Since, in the compression stroke injection mode, engine operation is achievable even if the overall air-fuel ratio is set to a large value (e.g., to an air-fuel ratio of "40"), fresh intake air and recirculated exhaust gas (EGR) can be supplied to the cylinder in large quantities, whereby the pumping loss is reduced, thereby remarkably improving the fuel efficiency. It is, therefore, desirable that the region of engine operation in the compression stroke injection mode should be expanded as large as possible to improve the fuel efficiency.

In medium- and high-load operations, on the other hand, the suction stroke injection mode, in which fuel is injected mainly during the suction stroke, is selected to produce a mixture having a uniform air-fuel ratio throughout the combustion chamber, so that the output required during acceleration or high-speed travel can be obtained by burning a large quantity of fuel, as in manifold-injection gasoline engines (Where the air-fuel ratio is controlled to a value in the vicinity of the stoichiometric air-fuel ratio, the injection mode is called stoichiometric-feedback (S-FB) mode, and where the air-fuel ratio is controlled to a leaner side (e.g., to an air-fuel ratio of about "22") than the stoichiometric air-fuel ratio, the injection mode is called suction-lean mode).

In manifold-injection gasoline engines, the combustible air-fuel ratio zone (lean-burn zone) of the mixture supplied to the engine is narrow, and therefore, almost constant output torque is obtained in the entire combustible air-fuel ratio zone insofar as the volumetric efficiency $E_v$ is constant. Namely, the engine output torque is determined substantially uniquely by the volumetric efficiency $E_v$. Accordingly, in manifold-injection gasoline engines, the values of engine control parameters, such as a target air-fuel ratio and target ignition timing, are set based on the volumetric efficiency $E_v$ obtained from the output of an air flow sensor, for example, and the engine operation is controlled in accordance with the control parameter values.

On the other hand, in the compression stroke injection mode control of the cylinder-injection gasoline engine, fuel is injected to the cavity at top of the piston so that stratified combustion of a lean mixture as a whole may take place, as mentioned above, and thus normal combustion is achievable if a combustible air-fuel mixture is present only around the spark plug. In other words, compared with the manifold-injection gasoline engine, the cylinder-injection engine has a much wider combustible air-fuel ratio range in terms of the overall air-fuel ratio. Specifically, in the compression stroke injection mode control of the cylinder-injection gasoline engine, engine operation is achievable over a wide air-fuel ratio range of from an ultra-lean air-fuel ratio (e.g., "50"), which is a lean-side combustible limit, to a rich-side combustible air-fuel ratio limit (e.g., an air-fuel ratio of "20"). Accordingly, even if the value of volumetric efficiency is the same, the engine output torque greatly varies with different target air-fuel ratios. The engine output torque changes nearly in proportion to the fuel supply quantity. This means that it is difficult to properly set the values of the engine control parameters, such as the target air-fuel ratio and the target ignition timing, in the compression stroke injection mode of the cylinder-injection gasoline engine in accordance with the volumetric efficiency $E_v$.

To overcome the difficulty, the applicant hereof has proposed using, in place of the volumetric efficiency $E_v$, an in-cylinder effective pressure $P_e$ as a parameter representative of the engine output when setting the engine control parameter values, such as the target air-fuel ratio and the target ignition timing, in the compression stroke injection mode control of the cylinder-injection gasoline engine or when determining whether or not mode switching between the compression stroke injection mode and the suction stroke injection mode is to be performed. More specifically, a target in-cylinder effective pressure (load value) $P_e$, which is correlated with the engine output that the driver desires, is obtained based on the accelerator opening (throttle valve opening) and the engine rotational speed, and the fuel supply quantity (target air-fuel ratio), ignition timing, etc. are set in accordance with the target value $P_e$.

In spark-ignition engines, the ignition timing is a critical factor that determines the engine output, fuel efficiency, etc. Where air-fuel mixture is burned under the same conditions, optimum ignition timing MBT (Minimum spark advance for Best Torque) for producing a maximum torque is uniquely determined. If the ignition timing shifts from the optimum ignition timing to an advance (advance angle) side or a retard (retard angle) side, then the combustion pressure cannot be effectively utilized, lowering both the output and the fuel efficiency. In cases where low-octane fuel is used, the ignition timing generally needs to be retarded from the optimum ignition timing MBT in order to prevent the occurrence of knocking or the like. Therefore, the frequency of knocking is monitored with the use of a knock sensor or the like, and while the frequency of knocking is low, the ignition timing is shifted to as close timing to the MBT as possible to thereby prevent the output or the fuel efficiency from lowering.

In cylinder-injection spark-ignition gasoline engines, a shock accompanying the switching of injection modes should desirably be prevented, and it is also desirable that the engine control at the time of mode switching be facilitated. To meet the needs, the applicant hereof has proposed controlling the engine at the time of mode switching by the method described below.

FIG. 1 shows an output torque T of the cylinder-injection gasoline engine in each of the compression-lean mode, suction-lean mode and S-FB mode as a function of ignition timing SA.

In FIG. 1, curve I indicated by the one-dot-chain line, curve II indicated by the broken line, and curve III indicated by the solid line respectively, show the engine characteristics in the compression-lean mode, the suction-lean mode, and the S-FB mode. The characteristic curves I, II, and III are plotted based on data obtained through test operations of the engine in the respective injection modes under the same conditions (the engine control parameter values such as the air-fuel ratio, and environmental parameter values such as atmospheric density are fixed). Also, in FIG. 1, sign ● (points A, B and C) represents the ignition timing at which a torque corresponding to a mean effective pressure value $XP_e$ is obtained in the case where premium gasoline is used, and sign Δ (points A1, B1 and C1) represents the ignition timing at which a maximum torque is obtained without entailing knocking in the case where regular gasoline is used.

The point A on the characteristic curve I related to the compression-lean mode (strictly, the point where a straight line (not shown) extending from the point A perpendicularly to the horizontal axis intersects with the horizontal axis) denotes ignition timing, at which a torque corresponding to a mean effective pressure equal to a switching criterion value $XP_e$, is obtained at the time of mode switching between the compression-lean mode and another mode, and this ignition timing (point A) is nearly equal to the optimum ignition timing MBT. In the compression-lean mode, as seen from FIG. 1, ignition timing (point A1), at which a torque corresponding to the mean effective pressure $XP_e$ is obtained where regular gasoline is used, nearly coincides with the corresponding ignition timing (point A) in the case where premium gasoline is used. The ignition timing corresponding to the point A1 takes an angular value slightly retarded from that corresponding to the point A. This means that, where regular gasoline is used, knocking is less liable to occur in the compression-lean mode of the cylinder-injection gasoline engine, compared with the other injection modes, because the air-fuel mixture burns while flowing in layers along the cavity of the piston and thus the combustion gas is cooled by the wall surfaces of the cavity etc.

Similarly, points B and C on the respective characteristic curves II and III related to the suction-lean mode and the S-FB mode each denote the ignition timing, at which a torque corresponding to the mean effective pressure equal to the criterion value $XP_e$ is obtained at the time of mode switching, in the case where premium gasoline is used.

Where premium gasoline is used, the transition from the compression-lean mode to the S-FB mode may be effected at an instant when a target load $P_e$ reaches the switching criterion value $XP_e$, and at the time of this mode switching, engine operation conditions (ignition timing, air-fuel ratio (fuel quantity), etc.) corresponding to the point A on the characteristic curve I related to the compression-lean mode may be changed to those corresponding to the point C on the curve III related to the S-FB mode, whereby the torque generated before and after the mode switching can be kept at a fixed value corresponding to the mean effective pressure $XP_e$, permitting the injection mode switching to be effected without causing a switching shock.

Depending on the properties of fuel used in the cylinder-injection gasoline engine, however, a problem arises at the time of mode switching between the compression stroke injection mode and the suction stroke injection mode.

For example, the problem described below arises when regular gasoline, which is lower in octane number than premium gasoline, is used. Optimum ignition timings, at which no knocking occurs, in the suction-lean mode and the S-FB mode while regular gasoline is used are represented by points B1 and C1, respectively. Thus, at the time of switching the injection mode from the compression-lean mode to the suction-lean mode or the S-FB mode while regular gasoline is used, it is necessary that the ignition timing be controlled to the point B1 or C1, in order to prevent knocking. However, if, while regular gasoline is used, the compression-lean mode is switched to the S-FB mode with the other engine operation conditions (e.g., air-fuel ratio condition etc.) than the ignition timing kept unchanged before and after the mode switching, as in the case where premium gasoline is used, then the engine output torque changes from the point A1 to the point C1 in FIG. 1, producing a torque difference of $\Delta T_a$. Likewise, where the suction-lean mode is switched to the S-FB mode, a torque difference of $\Delta T_b$ is caused. If such a torque difference is caused at the time of switching the injection modes, the driver is given a feeling of deceleration or acceleration and the drivability greatly lowers.

Referring now to FIG. 2, the reason for the occurrence of the aforementioned torque difference will be explained in more detail. FIG. 2 illustrates engine operations observed in the case where the throttle opening $\theta_{th}$ is varied in an incremental direction with the engine rotational speed kept fixed, wherein the generated torque T (mean effective pressure $P_e$) is shown as a function of the throttle opening $\theta_{th}$. In FIG. 2, the solid line indicates an operation line obtained where premium gasoline is used, and the broken line indicates an operation line obtained where regular gasoline is used.

Where premium gasoline is used, the compression-lean mode is selected while the engine is operated with such an engine load that the throttle opening $\theta_{th}$ falls within a range of zero to $\theta_1$. If the throttle opening $\theta_{th}$ exceeds $\theta_1$ and the target load $P_e$ reaches the switching criterion value $XP_e$ (point A in FIG. 2), the engine operation region shifts from the compression-lean region to the S-FB region and the injection mode is switched from the compression-lean mode to the S-FB mode. As indicated by the solid line in FIG. 2, the engine output torque takes a value (points A and A1) corresponding to the mean effective pressure $XP_e$ before and after the mode switching, and thus there occurs no torque difference at the time of mode switching.

Also in the case where regular gasoline is used, while the throttle opening $\theta_{th}$ falls within the range from zero to $\theta_1$, the engine operation control is performed in the compression-lean mode by using engine control parameter values identical with those employed in the case of using premium gasoline. This is because, in the compression-lean mode, knocking does not occur even if the engine is subjected to operation control similar to that performed when premium gasoline is used.

In the S-FB region or the suction-lean region, however, the ignition timing needs to be retarded in order to prevent knocking, unlike the case where premium gasoline is used. Accordingly, in FIG. 2, when the target load $P_e$ reaches the switching criterion value $XP_e$ and the compression-lean mode is switched to the S-FB mode, the ignition timing is shifted from the point A1 to C1 in FIG. 2 and the engine-output torque changes suddenly from the point A1 to C1, producing the torque difference $\Delta T_a$. Thus, where regular gasoline is used, the torque generated in the S-FB mode after the mode switching is smaller than that generated in the compression-lean mode before the mode switching by an amount corresponding to the ignition retard for prevention of knocking, unlike the case where premium gasoline is used, with the result that a shock occurs at the time of mode switching.

Also known is ignition timing control which takes account of the fact that knocking occurs differently due to individual difference of engines (variations in products) or due to change with time. Unexamined Japanese Patent Publications (KOKAI) No. 59-10862 and No. 61-157760, for example, disclose a technique of obtaining a knock learned value based on cumulative evaluation of control data etc. used in ignition retard control based on the knock sensor output, and controlling the ignition timing in accordance with the knock learned value. Even if this technique is applied to injection mode-switching type cylinder-injection internal combustion engine, however, a shock can occur at the time of switching the injection modes (engine control modes), as in the case where the ignition timing is set in the aforementioned manner in accordance with the properties of fuel.

DISCLOSURE OF THE INVENTION

An object of the present invention is to provide a control apparatus for a cylinder-injection spark-ignition internal combustion engine that can eliminate or lessen a torque shock at the time of switching engine control modes and yet can prevent deterioration in fuel efficiency.

To achieve the above object, the present invention provides a control apparatus for a cylinder-injection spark-ignition internal combustion engine having a fuel injection valve for injecting fuel directly into a combustion chamber thereof, the control apparatus being arranged to switch control mode of the internal combustion engine in accordance with an engine operating state between compression stroke injection mode control, in which fuel is injected mainly during a compression stroke to achieve stratified combustion, and suction stroke injection mode control, in which fuel is injected mainly during a suction stroke to achieve uniform mixture combustion.

The control apparatus according to the present invention comprises: target load setting means for setting a target load value in accordance with accelerator opening information, which is based at least on driver's operation; mode switching means for performing mode switching between the compression stroke injection mode control and the suction stroke injection mode control, based at least on the target load value; parameter detecting means for detecting a state parameter value, which is related to a property of fuel supplied to the internal combustion engine or related to a degree of occurrence of knocking peculiar to the internal combustion engine; engine output control parameter setting means for setting a parameter value for engine output control based on the target load value; and switching correction means for subjecting the mode switching to correction based on the detected state parameter value, to thereby compensate for an engine output change at the mode switching.

According to the present invention, at the time of mode switching between the compression stroke injection mode control and the suction stroke injection mode control, mode switching-related correction is performed based on the value of a state parameter, which is related to the properties of fuel or to the degree of occurrence of knocking of the engine, to thereby compensate for an engine output change at the mode switching. Consequently, even in the case where the fuel used is replaced with one of different properties or the degree of occurrence of knocking varies due to an individual difference of the engine or due to a change with time, shock at the time of mode switching can be prevented or reduced.

A typical example of the engine output control parameter is ignition timing but it may be air-fuel ratio, compression ratio, boost pressure, etc.

Preferably, in the present invention, the mode switching means compares the target load value with a predetermined criterion value and carries out the mode switching in accordance with the comparison result. The switching correction means corrects at least one of the target load value, the criterion value, and the engine output control parameter value for the compression stroke injection mode control.

With this preferred control apparatus, an engine output change at the mode switching can be reliably suppressed by correcting one or more of the target load value, the criterion value, and the engine control parameter value (e.g., fuel injection quantity) used in the compression stroke injection mode control, at the time of mode switching.

In the correction at the time of mode switching, a suitable one or more of the target load value, the criterion value and the engine control parameter value may be selected as a subject of correction, whereby a required shock reduction effect can be achieved and also the control procedure for carrying out the correction can be simplified.

Where the engine control parameter value is selected as the subject of correction, it is corrected directly based on the state parameter value. In this case, torque generated in the mode, from which the control mode is switched, can be varied toward torque to be generated in the mode, to which the control mode is switched, so that torque generated before and after the mode switching can be made equal.

On the other hand, where the target load value is selected as the subject of correction, the engine control parameter value is corrected indirectly and a shock reduction effect is achieved at the time of mode switching.

Preferably, in the present invention, the switching correction means corrects the target load value. The engine output control parameter setting means sets an engine output control parameter value for the compression stroke injection mode control, based on the corrected target load value. The mode switching means carries out the mode switching in accordance with the result of comparison between the corrected target load value and the criterion value.

In this preferred control apparatus, the target load value is selected as the subject of correction for the mode switching and the engine control parameter value is corrected indirectly. Specifically, the target load value is corrected based on the state parameter value so that the torque generated before and after the mode switching may become equal, and the engine control parameter value, used in the compression stroke injection mode, is set based on the thus-corrected target load value. As a result, at the time of mode switching, torque generated in the compression stroke injection mode control can be made equal to that generated in the suction stroke injection mode control, whereby switching shock can be prevented.

Referring to FIGS. 3 to 5, two methods for coincidence of torque generated before and after the mode switching will be explained taking a mode switching from the compression-lean mode to the S-FB mode as an example in the case where regular gasoline is used.

The first method is to restrict the torque generated at the mode switching to a value (corresponding to a mean effective pressure $P_{ec1}$) indicated by point C1 in FIGS. 3 and 4. Thus, in the compression stroke injection mode control, a target mean effective pressure value (target load value) is subjected to octane number-based correction by means of an octane number correction value (state parameter value) for compensating for the difference in octane number (fuel property) between premium gasoline and regular gasoline. Torque generation is controlled based on the octane number-corrected target mean effective pressure value so that the torque generated may be gradually varied toward the torque ($P_{ec1}$) to be generated at the time of mode switching. As a result of the octane number-based correction, the target mean effective pressure value $P_e$ (generated torque) is reduced from the value on the curve indicated by the solid line in FIG. 4 to the value on the curve indicated by the dashed line in the same figure. Also, the torque-ignition timing characteristic in the compression-lean mode shifts from curve I to curve I', indicated by the broken lines in FIG. 3. At the point of time (point A in FIGS. 3 and 4) when the non-corrected target mean effective pressure $P_e$ (corresponding to the curve I in FIG. 3 and to the solid-line curve in FIG. 4) reaches the switching criterion value $XP_e$, switching from the compression-lean mode to the S-FB mode is effected. The generated torque and the ignition timing at the time of mode switching are indicated by point A1 in FIGS. 3 and 4.

The second method is similar to the first method in that during the compression-lean mode control, the torque generation is controlled based on the octane number-corrected target mean effective pressure. In the second method, however, unlike the first method in which the judgment of mode switching is made based on the non-corrected target mean effective pressure $P_e$, the judgment of mode switching is made based on the octane number-corrected target mean effective pressure, and the mode switching is effected when the corrected target mean effective pressure reaches the criterion value $XP_e$. Namely, in the second method, the mode switching is delayed until the throttle opening $\theta_{th}$ reaches a value $\theta_2$, in contrast with the first method, in which the mode switching is effected when a throttle opening $\theta_1$ is reached. When the torque generated in the compression-lean mode reaches a torque value corresponding to the target mean effective pressure equal to the switching criterion value $XP_e$, switching to the S-FB mode is effected (see FIG. 5). The torque-ignition timing characteristic in the S-FB mode immediately after the mode switching is indicated by a solid-line curve III' in FIG. 3.

With the above preferred control apparatus, in which the timing of mode switching is delayed by switching the control modes in accordance with the result of comparison between the target load value which has been corrected based on the state parameter value and the criterion value, it is possible to expand an operation region, in which the engine is operated in the compression stroke injection mode excellent in fuel efficiency characteristics, whereby the fuel efficiency is remarkably improved.

Preferably, in the present invention, the switching correction means corrects the target load value and the criterion value. The engine output control parameter setting means sets an engine output control parameter value for the compression stroke injection mode control, based on the corrected target load value. The mode switching means carries out the mode switching in accordance with the result of comparison between the corrected target load value and the corrected criterion value.

In this preferred control apparatus, the criterion value is corrected based on the state parameter value, and therefore, the compression stroke injection mode control region can be expanded, thus further improving the fuel efficiency.

Preferably, in the present invention, the switching correction means corrects the target load value. The engine output control parameter setting means sets an engine output control parameter value for the compression stroke injection mode control, based on the corrected target load value. The mode switching means carries out the mode switching in accordance with the result of comparison between the non-corrected target load value and the criterion value.

In this preferred control apparatus, the engine control parameter value is set in accordance with the target load value, which has been corrected based on the state parameter value, while the judgment of mode switching is made based on the non-corrected target load value. In this case, as stated above with reference to FIGS. 3 and 5, the timing of mode switching is delayed and thus the compression stroke injection mode control region is substantially expanded, whereby the fuel efficiency can be improved.

The control apparatus according to the preferred aspects of the present invention will be explained in more detail.

As described above, in accordance with the target load value, which has been corrected based on the state parameter value, torque generated during the compression stroke injection mode control is variably controlled toward the torque to be generated at the time of mode switching, and this contributes to reducing shock at the time of mode switching. In engine operation in the suction stroke injection mode, however, a region (knock zone) in which knocking occurs is not located at a low-load region, and thus it is desirable that the correction of the target load value based on the state parameter value should be initiated at the point of time when entry into the knock zone is detected based on the target load value. This is because, if the correction of the target load value, which reflects the torque as demanded by the driver, is initiated at a lower-load side than the knock zone, the driver's required torque cannot be attained.

The target load value may be set taking account only of accelerator opening information based on the driver's operation; preferably, however, it is set in accordance with the accelerator opening information and the engine rotational speed. The accelerator opening information may be of any kind insofar as it is correlated with the engine output as demanded by the driver. For example, the valve opening of the throttle valve may be used as the accelerator opening information. For an engine of a so-called fly-by-wire type, the amount of depression of the accelerator pedal may alternatively be used as the accelerator opening information.

When the engine is applied with load due to operation of an air conditioner or power steering, such engine load may be added to the target load value. Also, where the engine is operated at high altitudes, the target load value may be corrected based on the air density.

The parameter detecting means may be either a type, which directly detects the properties of fuel with the use of an optical sensor, for example, or a type, which detects occurrences of knocking of the internal combustion engine, to thereby indirectly detect the properties of the fuel used based on a long-term tendency to knock.

The method of correcting the target load value or the criterion value based on the state parameter value is not particularly limited; for example, a correction value may be read from a map in accordance with the state parameter value and this correction value may be added to or multiplied by the target load value or the criterion value.

As the engine output control parameter, target air-fuel ratio, fuel injection timing, ignition timing, target quantity of recirculated exhaust gas, or the opening of a bypass valve (target flow rate of bypass air) arranged in a passage bypassing the throttle valve may be used.

Further, the engine output control parameter value may be subjected to correction based on engine water temperature, learning-correction relating to engine deterioration, etc.

In the suction stroke injection mode, the engine output control parameter value is preferably set by using a parameter that is nearly determinately correlated with the output as demanded by the driver and can be measured directly, such as volumetric efficiency $E_v$, charging efficiency $\eta_v$, intake air flow rate A/N per suction stroke, boost pressure $P_b$ or the like. The judgment of mode switching between the compression stroke injection mode and the suction stroke injection mode is preferably made based on the target load value which is set in accordance with the accelerator opening information based on the driver's operation, but the basis for making the judgment is not particularly limited.

BEST MODE OF CARRYING OUT THE INVENTION

Internal combustion engine control apparatus according to first to third embodiments of the present invention will be hereinafter described in detail with reference to the drawings. The first to third embodiments are identical in hardware configuration and differ from one another only in software-implemented control procedure; therefore, the hardware configuration will be explained first.

Figure 6:
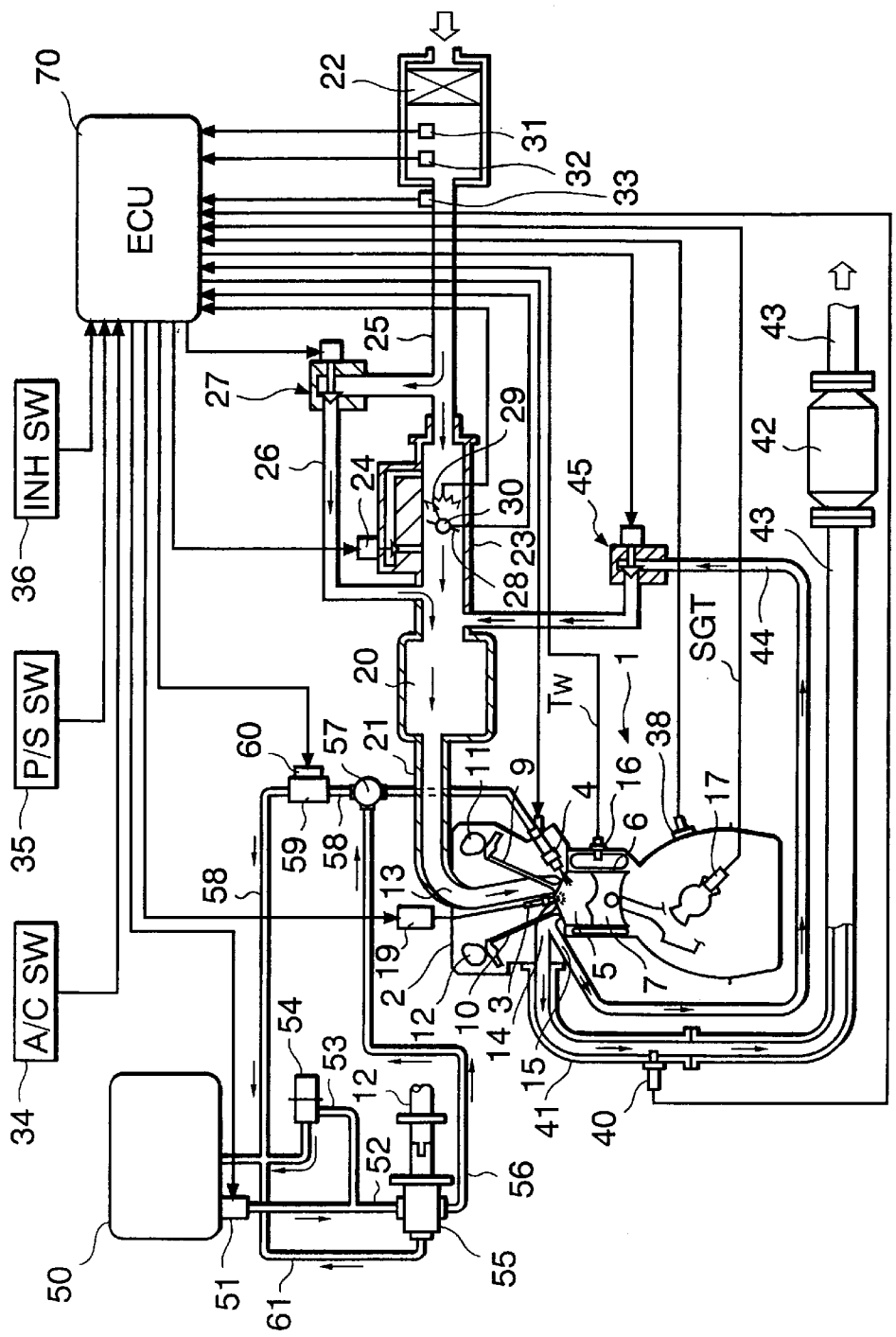
FIG. 6 is a diagram schematically showing the arrangement of an engine control apparatus according to the present invention.
Figure 7:
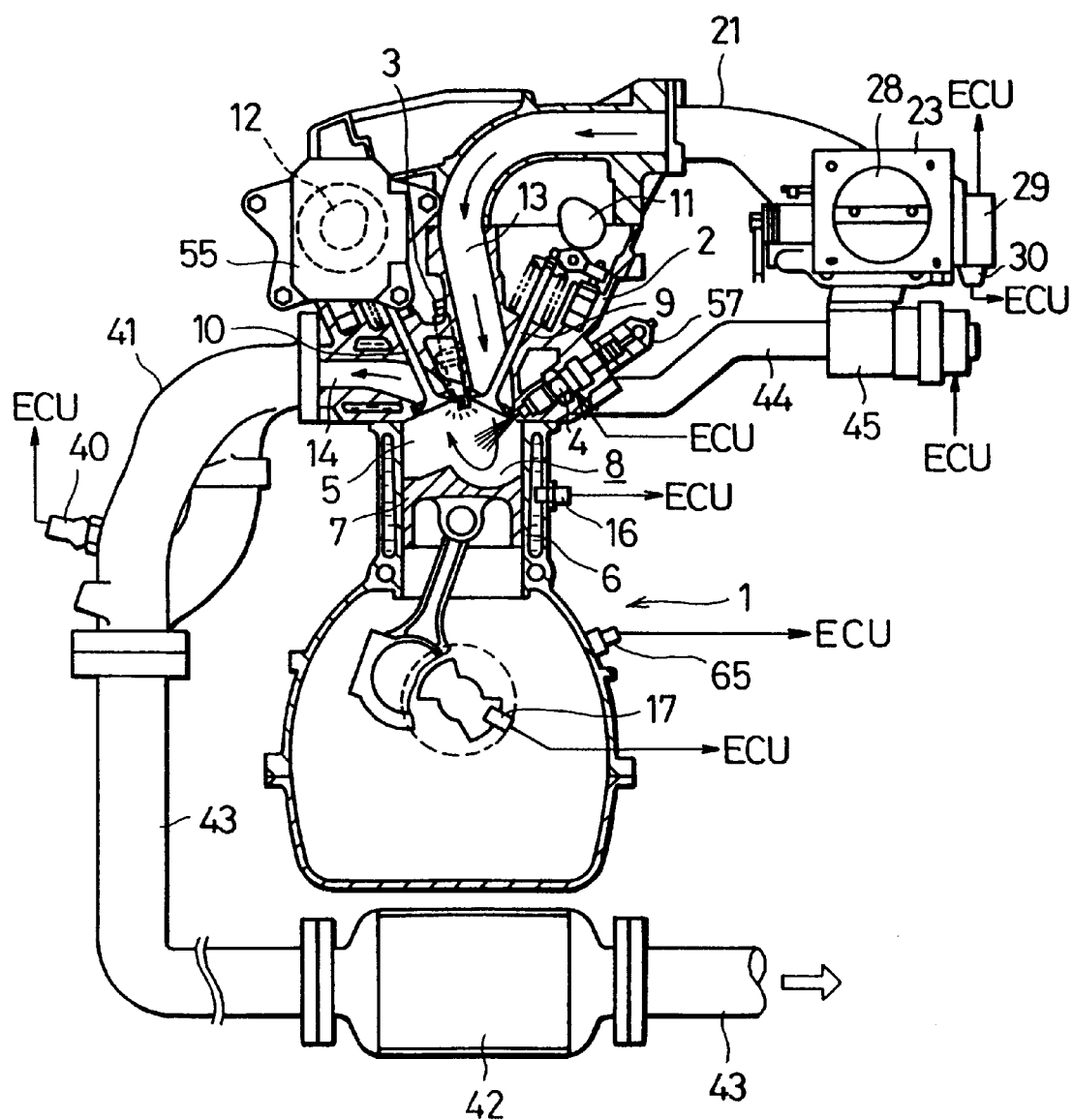
FIG. 7 is a longitudinal sectional view of a cylinder-injection gasoline engine according to the present invention.

Referring to FIGS. 6 and 7, reference numeral 1 denotes a cylinder-injection type in-line four-cylinder gasoline engine (hereinafter merely referred to as engine) for a motor vehicle. The engine 1, inclusive of combustion chambers 5, an intake system, an EGR system, etc. associated therewith, is designed specially for cylinder-injection mechanism.

To a cylinder head 2 of the engine 1 are mounted a spark plug 3 and a solenoid-operated fuel injection valve 4 for each of the cylinders. Each injection valve 4 injects fuel directly into the corresponding combustion chamber 5. A hemispherical cavity 8 (FIG. 7) is formed on the top of a piston 7, which is received in a cylinder 6 for reciprocating motion. More specifically, the cavity 8 is formed on the top face of the piston at a location such that fuel spray from the fuel injection valve 4 can reach the cavity when fuel injection is effected during the latter half of the compression stroke. Also, the theoretical compression ratio of the engine 1 is set to a high level (in this embodiment, about "12"), compared with manifold-injection engines. A valve actuating mechanism used is a DOHC four-valve type, and an intake-side camshaft 11 and an exhaust-side camshaft 12 are rotatably supported at the upper part of the cylinder head 2 to actuate intake and exhaust valves 9 and 10, respectively.

The cylinder head 2 has intake ports 13 formed therein, which extend substantially upright to pass between the two camshafts 11 and 12. The intake air flow passing through the intake ports 13 can produce a reverse tumble flow, described later, within the combustion chamber 5. Exhaust ports 14 extend substantially in the horizontal direction as with the case of the conventional engine, and a large-diameter EGR port 15 (not shown in FIG. 7) branches off downward slantingly. In FIG. 6, reference numeral 16 denotes a water temperature sensor for detecting a cooling water temperature $T_W$, 17 denotes a crank angle sensor for outputting a crank angle signal SGT at predetermined crank positions (in this embodiment, 5° BTDC and 75° BTDC) of the cylinder associated therewith, and 19 denotes an ignition coil for applying a high voltage to the spark plug 3. The camshaft concerned, which rotates at half the speed of a crankshaft, is provided with a cylinder discrimination sensor (not shown) for outputting a cylinder discrimination signal SGC. The cylinder discrimination signal serves to discriminate the cylinder with respect to which the crank angle signal SGT is generated.

A knock sensor 38 is mounted on the body (cylinder block) of the engine 1 at a predetermined location and detects knocking of the engine 1. The knock sensor 38 may be mounted to only one of the cylinders of the engine 1 or may be mounted to each cylinder.

As shown in FIG. 6, the intake ports 13 are connected to an intake pipe 25 through an intake manifold 21 having a surge tank 20. The intake pipe 25 is provided with an air cleaner 22, a throttle body 23, and a stepper motor-driven idle speed control valve (hereinafter referred to as idling control valve) 24. The intake pipe 25 is further provided with a large-diameter air bypass pipe 26 which bypasses the throttle body 23 for introducing intake air into the intake manifold 21, and a linear solenoid-type large-sized air bypass valve (hereinafter referred to as ABV) 27 is arranged in the air bypass pipe 26. The air bypass pipe 26 has a flow area substantially equal to that of the intake pipe 25, so that a required quantity of intake air for a low- or medium-speed region of the engine 1 can be introduced when the ABV 27 is fully open. A bypass passage, in which the idling control valve 24 is arranged, has a smaller flow area than the air bypass pipe 26, and the idling control valve 24 is used when the quantity of intake air needs to be controlled with accuracy.

The throttle body 23 is provided with a butterfly-type throttle valve 28 for opening and closing the flow passage, a throttle sensor 29 for detecting a throttle valve opening $\theta_{th}$ as accelerator opening information, and an idle switch 30 for detecting a fully closed state of the throttle valve 28. Inside the air cleaner 22 are arranged an atmospheric pressure sensor 31 and an intake air temperature sensor 32 for obtaining an intake air density, the sensors 31 and 32 outputting signals corresponding to an atmospheric pressure $P_a$ and an intake air temperature $T_a$, respectively. A Kármán vortex-type air flow sensor 33 is arranged in the vicinity of the inlet of the intake pipe 25 and outputs a vortex generation signal proportional to a volumetric air flow rate $Q_a$.

The exhaust ports 14 are connected to an exhaust pipe 43, which is provided with a three-way catalyst 42, a muffler (not shown), etc., through an exhaust manifold 41 to which an $O_2$ sensor 40 is attached. An end of the EGR port 15 remote from the exhaust port is connected via a large-diameter EGR pipe 44 to the intake pipe 25 at a location downstream of the throttle valve 28 and at the same time upstream of the intake manifold 21, and a stepper motor-driven EGR valve 45 is arranged in the pipe connected to the EGR port 15.

A fuel tank 50 is arranged at the rear of a vehicle body, not shown, of the vehicle. Fuel stored in the fuel tank 50 is drawn up by a motor-driven low-pressure fuel pump 51 and is supplied to the engine through a low-pressure feed pipe 52. The fuel pressure in the low-pressure feed pipe 52 is adjusted to a relatively low pressure (in this embodiment, 3.0 kgf/cm²; hereinafter referred to as low fuel pressure) by means of a first fuel pressure regulator 54, which is inserted in the line of a return pipe 53. The fuel fed to the engine 1 is delivered to each fuel injection valve 4 through a high-pressure feed pipe 56 and a delivery pipe 57 by means of a high-pressure fuel pump 55, which is mounted to the cylinder head 2. The high-pressure fuel pump 55, used in this embodiment, is a swash plate axial piston type, driven by the exhaust-side camshaft 12, and generates a discharge pressure of 50 kgf/cm² or higher even during idling of the engine 1. The fuel pressure in the delivery pipe 57 is adjusted to a relatively high pressure (in this embodiment, 50 kgf/cm²; hereinafter referred to as high fuel pressure) by means of a second fuel pressure regulator 59, which is inserted in the line of a return pipe 58. In the figure, reference numeral 60 denotes a solenoid-operated fuel pressure selector valve attached to the second fuel pressure regulator 59. When switched on, the fuel pressure selector valve 60 relieves the fuel to lower the fuel pressure in the delivery pipe 57 down to a predetermined value (e.g., 3.0 kgf/cm²). Reference numeral 61 denotes a return pipe, through which part of the fuel is returned to the fuel tank 50 after it is used to lubricate or cool the high-pressure fuel pump 55.

An ECU (electronic control unit) 70 is arranged in the compartment of the vehicle, and comprises input/output devices (not shown), storage devices (ROM, RAM, non-volatile RAM, etc.) storing control programs, control maps, etc., a central processing unit (CPU), timer counters, etc., for carrying out general control of the engine 1.

To the input side of the ECU 70 switches for detecting operating conditions of an air conditioner, a power steering system, an automatic transmission, etc. are connected. These units, when operated, apply load on the engine 1. These switches includs an air conditioner switch (A/C-SW) 34, a power steering switch (P/S-SW) 35, an inhibitor switch (INH-SW) 36, etc. These switches supply detection signals thereof to the ECU 70. In addition to the aforementioned various sensors and switches, numerous switches and sensors, not shown, are connected to the input side of the ECU 70, the output side of which is connected to various alarm lamps, devices, etc.

Based on signals input from the various sensors and switches mentioned above, the ECU 70 determines a fuel injection mode, fuel injection quantity, fuel injection end timing, ignition timing, quantity of EGR gas to be introduced, etc., and drivingly controls the fuel injection valves 4, the ignition coils 19, the EGR valve 45, etc.

A basic flow of engine control will be now outlined.

If the driver turns on the ignition key when the engine is cold, the ECU 70 switches on the low-pressure fuel pump 51 and the fuel pressure selector valve 60, whereupon fuel of low fuel pressure is supplied to the fuel injection valves 4. This is because during stoppage or cranking of the engine 1, the high-pressure fuel pump 55 does not operate at all or operates only incompletely and thus the fuel injection quantity must be determined based on the discharge pressure of the low-pressure fuel pump 51 and the valve opening time of the fuel injection valves 4. When the driver then turns the ignition key to start position, the engine 1 is cranked by a self-starter, not shown, and at the same time, fuel injection control is initiated by the ECU 70. At this point of time, the ECU 70 selects a suction stroke injection mode, whereby fuel is injected so that the air-fuel mixture may be relatively rich. This is done because, if fuel is injected in a compression stroke injection mode, a misfire or discharge of unburned fuel (HC) is unavoidable since the vaporization rate of fuel is low when the engine is cold. Also at the start of the engine, the ECU 70 closes the ABV 27. In this case, therefore, intake air is fed into the combustion chambers 5 through a clearance around the throttle valve 28 or through the bypass passage, in which the idling control valve 24 is arranged. The idling control valve 24 and the ABV 27 are controlled unitarily by the ECU 70, and their respective openings are determined in accordance with the required quantity of the intake air (bypass air) that bypasses the throttle valve 28.

When the engine 1 starts to idle after completion of engine start, the high-pressure fuel pump 55 initiates a rated discharging operation, and the ECU 70 switches off the fuel pressure selector valve 60 to supply the fuel injection valves 4 with fuel of high fuel pressure. At this time, the fuel injection quantity is determined in accordance with the high fuel pressure and the valve opening time of the fuel injection valves 4. By the time the cooling water temperature $T_W$ reaches a predetermined value, the ECU 70 continuously selects the suction stroke injection mode and keeps the ABV 27 closed, just as at the time of engine start. Idle speed control, which is dependent on increase/decrease in load applied by auxiliary units such as the air conditioner, is carried out by adjusting the opening of the idling control valve 24 (and opening the ABV 27 also, when necessary), as in manifold-injection engines. When the $O_2$ sensor 40 reaches an activation temperature following a certain number of cycles, the ECU 70 initiates air-fuel ratio feedback control based on the output voltage of the $O_2$ sensor 40, to purify harmful exhaust gas components by means of the three-way catalyst 42. Thus, when the engine is cold, fuel injection control similar to that applied to manifold-injection engines is performed. In the case of the cylinder-injection engine 1, however, control response and accuracy are high because, for example, fuel droplets do not adhere to the wall surface of the intake pipe 13.

Figure 8:
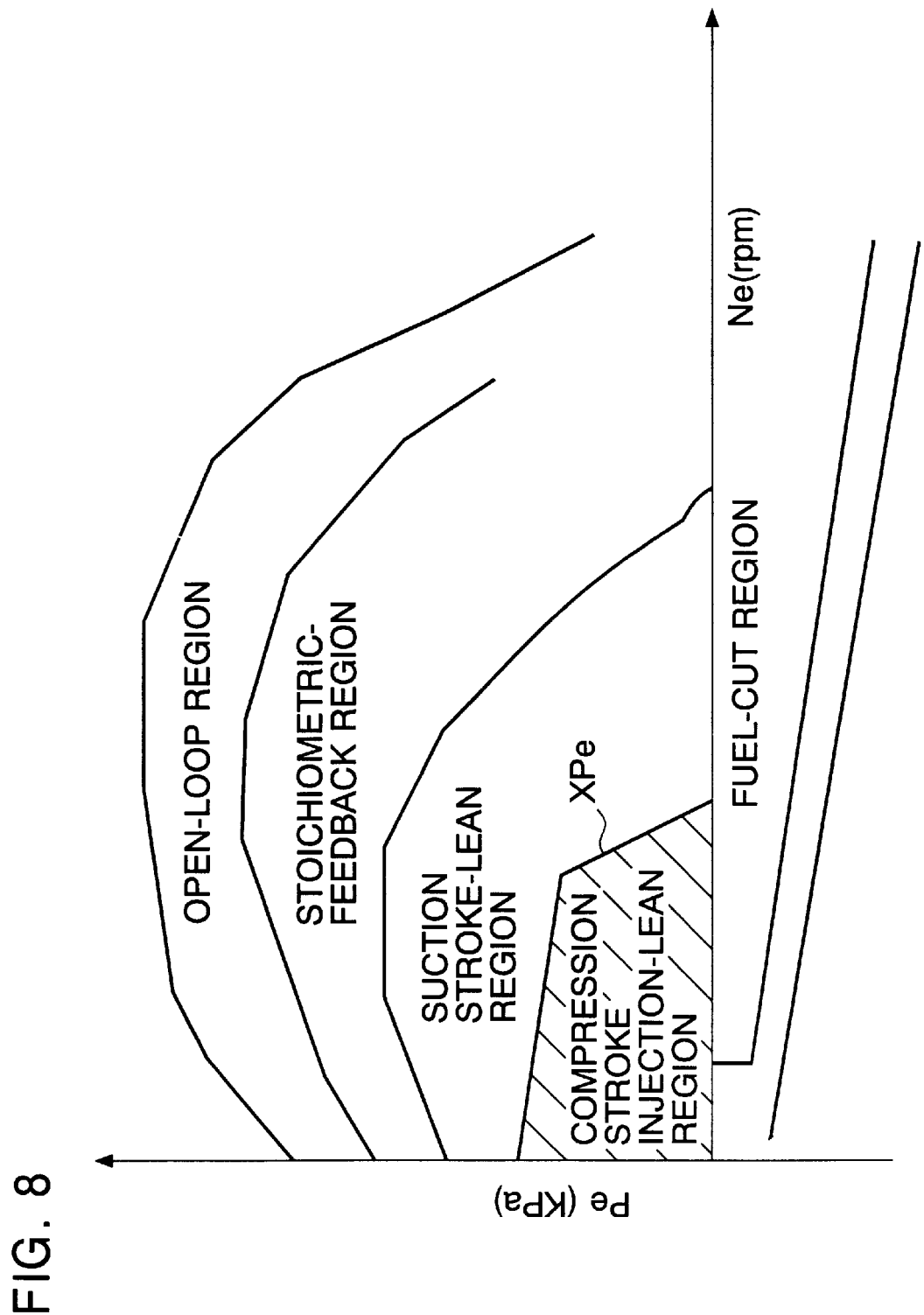
FIG. 8 is an engine control mode map showing a compression stroke injection-lean operation region, a suction stroke injection-lean operation region, a stoichiometric-feedback operation region, etc. bounded in terms of in-cylinder mean effective pressure $P_e$ and rotational speed $N_e$ of the engine.

When the warm-up of the engine 1 is completed, the ECU 70 identifies a current fuel injection control region from a fuel injection control map shown in FIG. 8 in accordance with a target in-cylinder effective pressure (target load) $P_e$, which is obtained from the throttle opening $\theta_{th}$ etc., and the engine speed (rotational speed) $N_e$, and determines the fuel injection mode and the fuel injection quantity for driving the fuel injection valves 4. Further, valve opening control for the ABV 27 and the EGR valve 45 is carried out.

Figure 9:
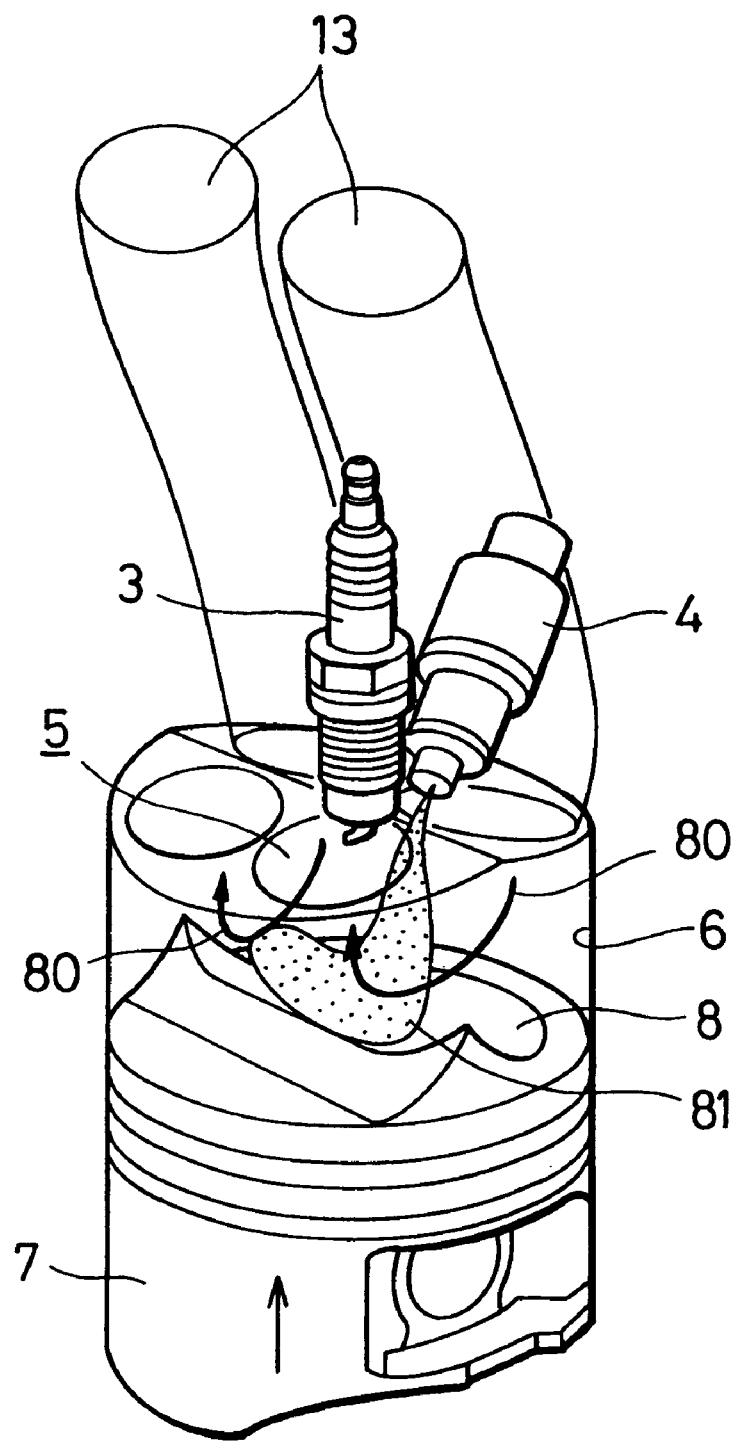
FIG. 9 is a diagram illustrating the manner of injecting fuel in compression stroke injection mode of a cylinder-injection spark-ignition internal combustion engine according to the present invention.

Specifically, during a low-load, low-speed operation such as idling, for example, the engine 1 is operated in a compression stroke injection-lean region indicated by hatching in FIG. 8. In this case, the ECU 70 selects the compression stroke injection mode and performs fuel injection to achieve a lean air-fuel mixture (in this embodiment, with an air-fuel ratio of approximately 20 to 40). The ECU 70 also adjusts the respective valve openings of the ABV 27 and the EGR valve 40 in accordance with the engine operating state. By this point of time, the vaporization rate of fuel has increased considerably. Since intake air introduced from the intake ports 13 produces a reverse tumble flow 80, as indicated by the arrows in FIG. 9, a fuel spray 81 is permitted to stay in the cavity 8 of the piston 7. Consequently, at the time of firing, a mixture with a nearly stoichiometric air-fuel ratio is produced around the spark plug 3, thus permitting combustion of the mixture even though the mixture is very lean as a whole (e.g., an overall air-fuel ratio is about 50). This greatly cuts down the emission of CO and HC, and also the emission of $NO_x$ can be reduced through recirculation of the exhaust gas. By opening the ABV 27 and the EGR valve 40, it is possible to reduce the pumping loss, and this remarkably improves the fuel efficiency. The idle speed control dependent on increase/decrease in the engine load is carried out by increasing/decreasing the fuel injection quantity. Accordingly, the control response is greatly enhanced.

In the compression stroke injection mode, it is necessary that a fuel spray from the injection valve 4 should reach the vicinity of the spark plug 3 while being guided by the aforementioned reverse tumble flow, and also that fuel should evaporate to produce a readily ignitable mixture by the time the ignition takes place. If, however, the mean air-fuel ratio is 20 or lower, an over-rich mixture is produced locally in the vicinity of the spark plug 3, causing a so-called rich misfire, and if the mean air-fuel ratio is 40 or higher, then the lean limit is exceeded and misfire (so-called lean misfire) is liable to occur. Taking these into account, in the compression stroke injection mode, fuel injection start and end timings and ignition timing are controlled with accuracy, as described later, and the mean air-fuel ratio is set to fall within a range of 20 to 40. When the set air-fuel ratio becomes deviated from the range, the compression stroke injection mode is switched to the suction stroke injection mode.

During low- or medium-speed travel, the engine 1 is operated in the lean region or stoichiometric-feedback region (stoichiometric air-fuel ratio feedback control region) in the suction stroke injection mode shown in FIG. 8, depending on the load condition and rotational speed $N_e$ of the engine. In this case, the ECU 70 selects the suction stroke injection mode and performs fuel injection so as to achieve a predetermined air-fuel ratio.

Figure 10:
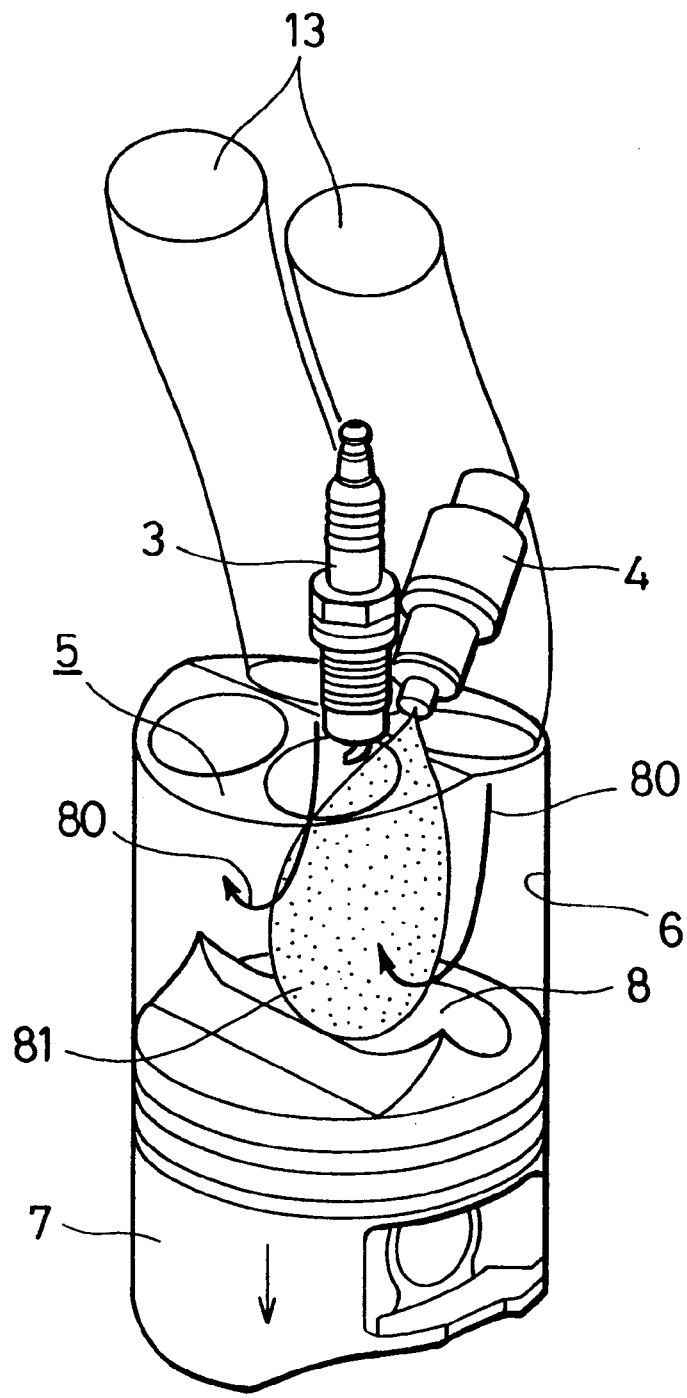
FIG. 10 is a diagram illustrating the manner of injecting fuel in suction stroke injection mode of the cylinder-injection spark-ignition internal combustion engine according to the present invention.

More specifically, in the lean region of the suction stroke injection mode, the valve opening of the ABV 27 and the fuel injection quantity are controlled so that a relatively lean mixture (e.g., with an air-fuel ratio of about 20 to 23) may be obtained. In the stoichiometric-feedback region (S-FB region), the ABV 27 and the EGR valve 45 are subjected to opening/closing control (however, the opening/closing control of the EGR valve 45 is executed only in a specified part in the stoichiometric-feedback region), and air-fuel ratio feedback control is carried out in accordance with the output voltage of the $O_2$ sensor 40. The intake air introduced from the intake ports 13 produces a reverse tumble flow 80 as shown in FIG. 10, and therefore, by adjusting the fuel injection start or end timing, it is possible to ignite a lean mixture with the aid of the effect of turbulence caused by the reverse tumble flow even in the lean region (suction stroke-lean region) of the suction stroke injection mode. In the stoichiometric-feedback region, a high output can be obtained because of a relatively high compression ratio, and harmful exhaust gas components are purified by the three-way catalyst 42.

During rapid acceleration or high-speed travel, the engine is operated in the open-loop control region shown in FIG. 8; therefore, the ECU 70 selects the suction stroke injection mode, closes the ABV 27, and performs fuel injection in accordance with the throttle opening $\theta_{th}$, the engine rotational speed $N_e$, etc. so that the air-fuel mixture may be relatively rich. In this case, high engine output is obtained because of high compression ratio as well as the formation of the reverse tumble flow 80 of intake air, and also because of the inertia effect achieved by the nearly uprightness of the intake ports 13 with respect to the combustion chamber 5.

When the vehicle is coasting at medium or high speed, the engine is operated in the fuel-cut region shown in FIG. 8, and thus the ECU 70 completely stops the fuel injection. This improves the fuel efficiency and at the same time reduces the emission of harmful exhaust gas components. Fuel cut is immediately terminated when the engine rotational speed $N_e$ drops below a restoration speed or when the driver steps on the accelerator pedal.

The following explains switching control between the compression stroke injection mode and the suction stroke injection mode and a procedure for setting various engine control parameter values based on the target mean effective pressure (target load) $P_e$, which is dependent on the properties of fuel, according to the first embodiment of the present invention. The engine control parameter values include valve opening time $T_{inj}$ of the fuel injection valves 4, fuel injection end timing $T_{end}$, ignition timing $T_{ig}$, valve opening $L_{egr}$ of the EGR valve 45, etc.

Figure 11:
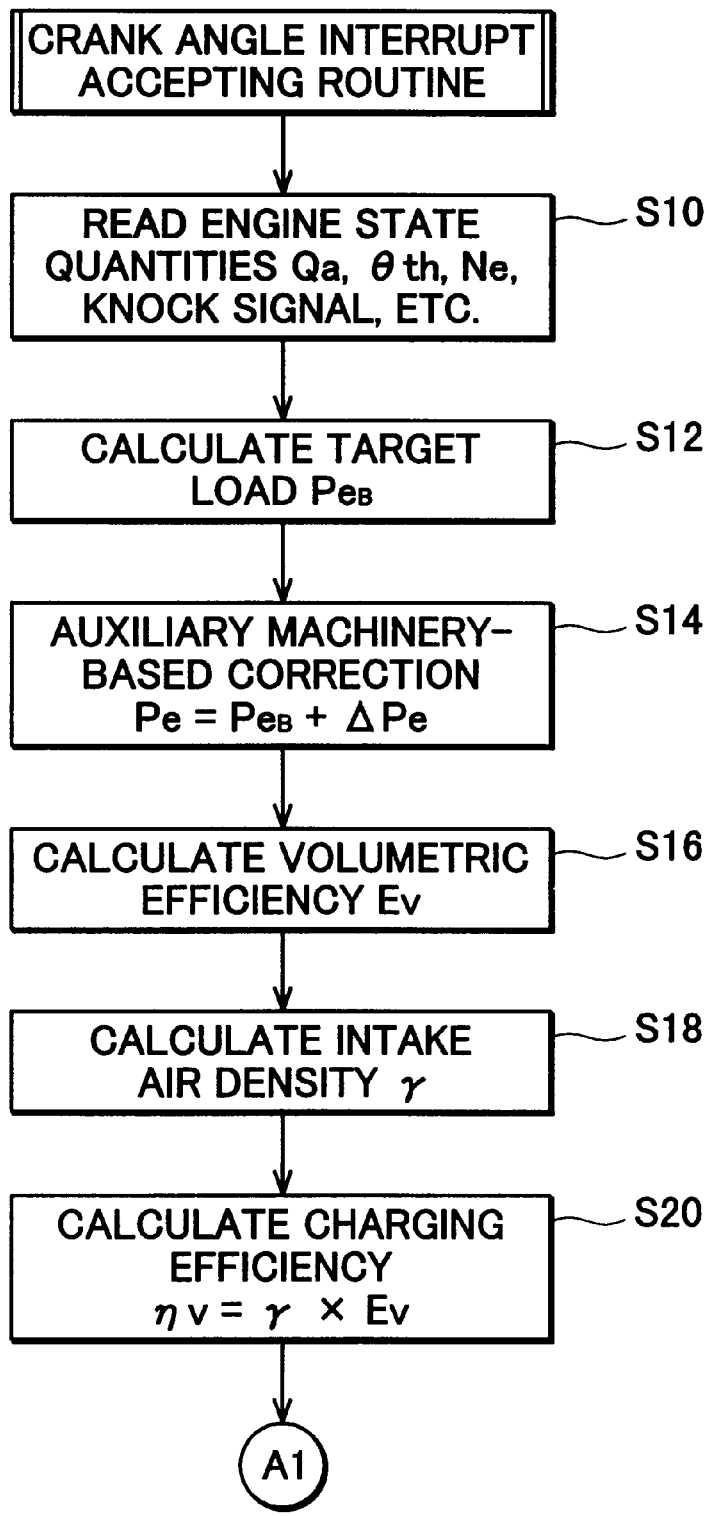
FIG. 11 is a flowchart showing part of a procedure of a crank angle interrupt accepting routine for calculating engine control parameter values, such as target mean effective pressure $P_e$, target air-fuel ratio AF, fuel injection end time $T_{end}$, ignition timing $T_{ig}$ and valve opening $L_{egr}$ of an EGR valve 45, and controlling the engine in accordance with the calculated engine control parameter values.
Figure 12:
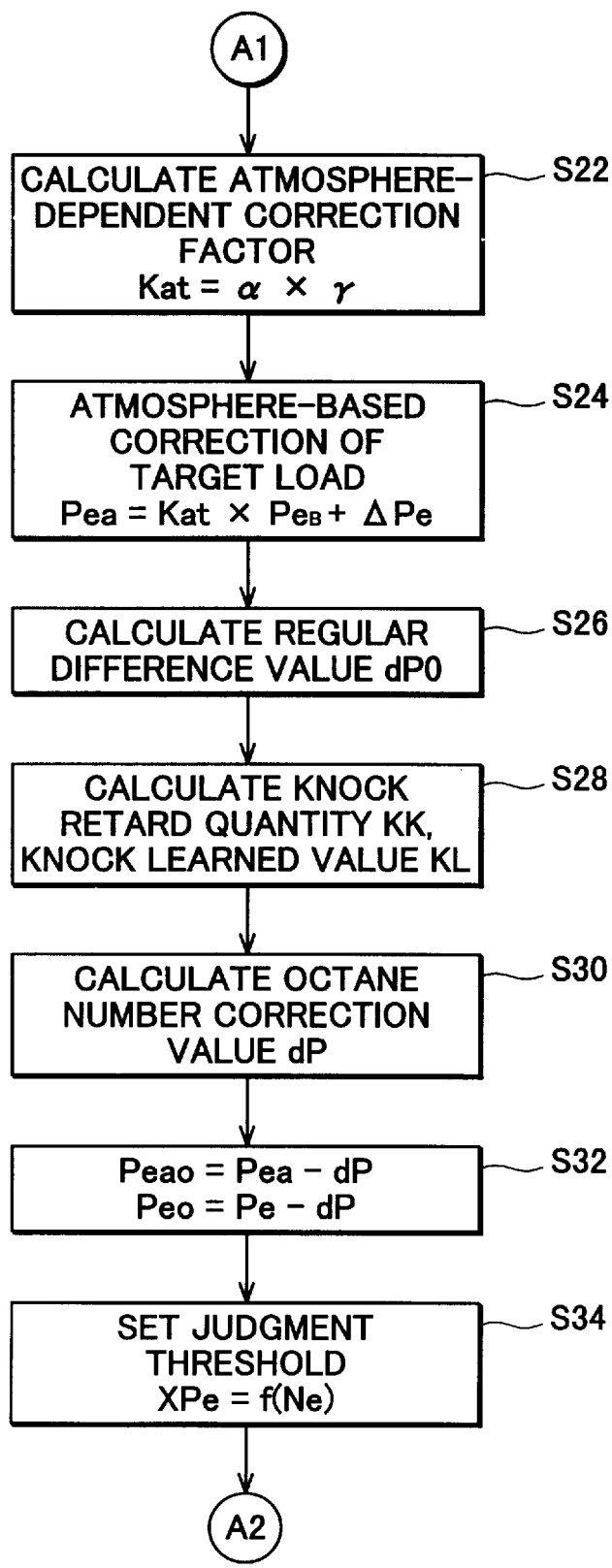
FIG. 12 is a flowchart showing another part of the crank angle interrupt accepting routine, following the part shown in FIG. 11.
Figure 13:
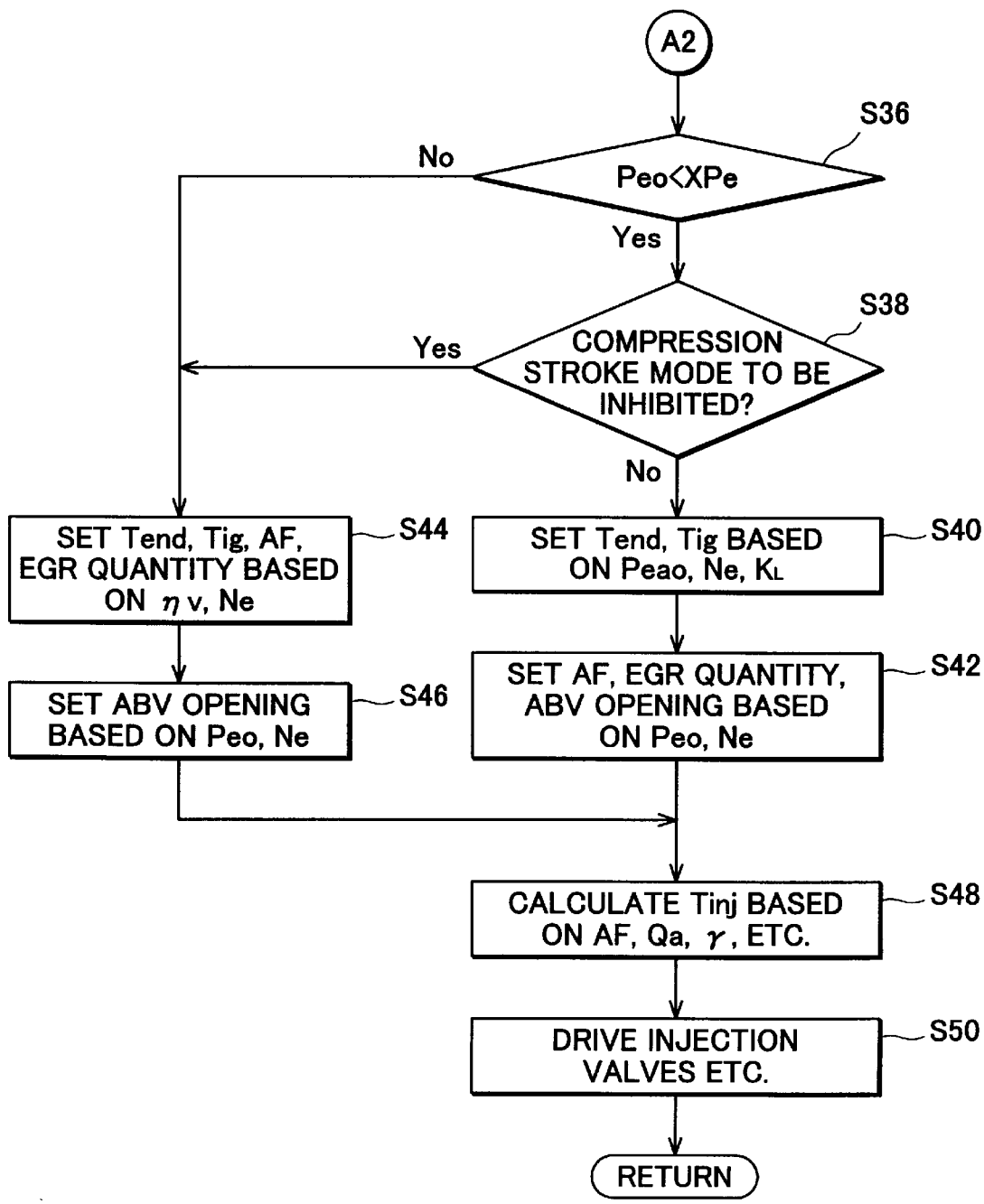
FIG. 13 is a flowchart showing the remaining part of the crank angle interrupt routine, following the part shown in FIG. 12.

The flowcharts of FIGS. 11 to 13 illustrate a routine for setting the various engine control parameter values and this routine is executed by the ECU 70, which accepts interruption each time the crank angle signal is output from the crank angle sensor 17.

First, in Step S10 in FIG. 11, the ECU 70 reads various engine state quantities, for example, the intake air quantity (volumetric air flow rate) $Q_a$ detected by the air flow sensor 33, the throttle opening $\theta_{th}$ detected by the throttle sensor 29, the atmospheric pressure $P_a$ detected by the atmospheric pressure sensor 31, the intake air temperature $T_a$ detected by the intake air temperature sensor 32, the engine speed (rotational speed) $N_e$ detected based on the time intervals, at which the crank angle signal is generated by the crank angle sensor 17, the operating state of the air conditioner detected by the air conditioner switch 33, the output signal of the knock sensor 38, etc.

Figures 14, 15:
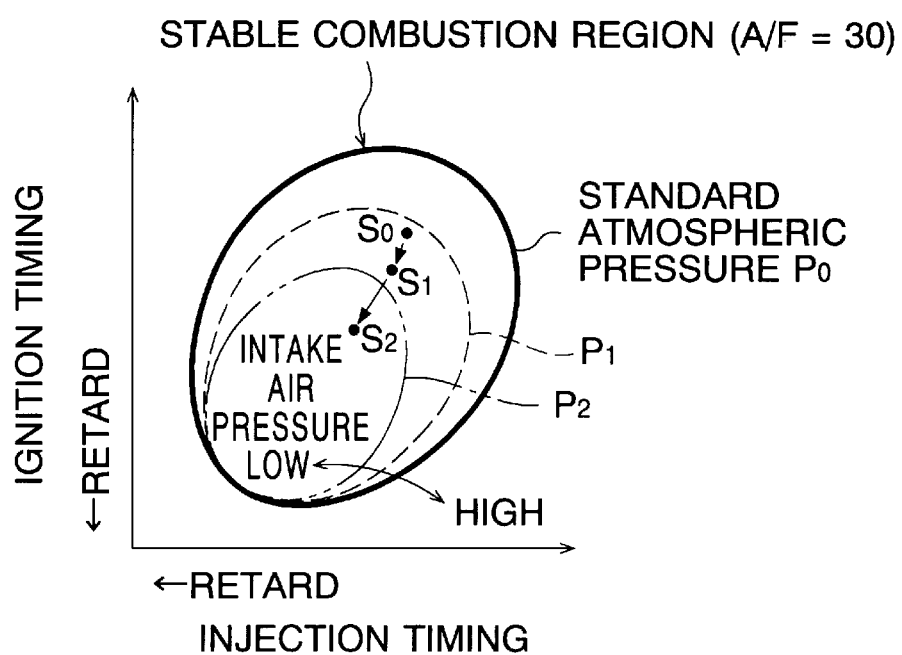
FIG. 14 is a diagram schematically illustrating the arrangement of a calculation map for target mean effective pressure $P_{eB}$ which is calculated based on valve opening $\theta_{th}$ of a throttle valve 28 and engine rotational speed $N_e$.
FIG. 15 is an injection timing-ignition timing operation map showing a region in which stable combustion is achieved through injection timing and ignition timing, by using intake air pressure as a parameter.

The ECU 70 then calculates a target mean effective pressure $P_{eB}$ (Step S12) based on the throttle opening $\theta_{th}$ and the engine rotational speed $N_e$ detected by the throttle sensor 29 and the crank angle sensor 17, respectively, by using a target mean effective pressure map stored beforehand in the storage device thereof. As shown in FIG. 14, in the target mean effective pressure map are mapped target mean effective pressures $P_{eBij}$ corresponding to outputs that the driver may demand, in association with the throttle valve opening $\theta_{th}$ and the engine rotational speed $N_e$. Applying a well-known four-point interpolation method to the map, for example, the ECU 70 calculates an optimum target mean effective pressure $P_{eB}$ corresponding to the detected throttle valve opening $\theta_{th}$ and the detected engine rotational speed $N_e$.

When collecting experimental data on the basis of which the map is to be created, brake mean effective pressures, which are easily obtainable by engine bench testing, for example, may be used as target mean effective pressure information. Where there is no particular inconvenience in the collection of data by bench testing, various kinds of information may be used as the target mean effective pressure information. The information may be the indicated mean effective pressures, net outputs or the like.

In Step S14, the target mean effective pressure $P_{eB}$ is subject to an auxiliary unit-dependent correction to obtain a corrected target mean effective pressure $P_e$, as indicated by the following equation (M1):

$$P_e = P_{eB} + \Delta P_e \qquad (M1)$$

In connection with the auxiliary unit-dependent correction, the storage device of the ECU 70 stores an engine output correction map relating to various load devices (auxiliary machinery) which, when operated, apply mechanical or electrical load on the engine 1, such as the air conditioner, power steering system, transmission, etc. When one or more of the switches 34 to 36 for detecting the operation of the respective load devices are set ON, the ECU 70 refers to the output correction map to obtain a target mean effective pressure correction value $\Delta P_e$ corresponding to the operating states of the load devices and the engine rotational speed $N_e$, and uses the obtained correction value $\Delta P_e$ for the aforementioned auxiliary unit-dependent correction. The target mean effective pressure $P_e$ calculated in this manner may be subjected to filtering as needed, to remove noise components and stabilize the control operation.

In Step S16, a volumetric efficiency $E_v$ is calculated. The volumetric efficiency $E_v$ can be easily calculated by dividing an intake air quantity per suction stroke, obtained based on the intake air flow rate (volumetric flow rate) $Q_a$ detected by the air flow sensor 33 and the engine rotational speed, by the volume of the combustion chamber 5. Then, in Step S18, an intake air density $\gamma$, which is an environmental parameter value, is calculated. The intake air density $\gamma$ also can be easily calculated based on the intake air temperature $T_a$ and the atmospheric pressure $P_a$, according to Boyle-Charles' law (equation of state of ideal gas). Subsequently, in Step S20, a charging efficiency $\eta_v$ is calculated based on the volumetric efficiency $E_v$ and the intake air density $\gamma$ obtained in Steps S16 and S18, respectively, according to the equation below.

$$\eta_v = \gamma \times E_v \qquad (M2)$$

Then, the ECU 70 performs an intake air density-based correction on the target mean effective pressure $P_e$, in Steps S22 and S24 in FIG. 12. The reason for performing the intake air density-based correction will be explained below.

In order to achieve stable stratified combustion within the cylinder of the cylinder-injection gasoline engine in the compression stroke injection mode, there are restrictions on the fuel injection timing and the ignition timing. In other words, stable combustion can be achieved only within a limited range of fuel injection and ignition timings (hereinafter referred to as stable combustion region). To attain stable combustion, therefore, these two engine control parameters need to be set to suitable values falling within the stable combustion region.

Accordingly, test operation was carried out to obtain a stable combustion region at a standard atmospheric pressure $P_0$. In the test operation, the air-fuel ratio was fixed at 30 under the standard atmospheric pressure, and the engine was operated with the injection timing and the ignition timing varied. For a variety of injection timing-ignition timing combinations, whether stable combustion could be achieved or not was determined, and a stable combustion region indicated by the solid line in FIG. 15 was obtained.

In the coordinate system of FIG. 15, in which the horizontal and vertical axes represent injection timing and ignition timing, respectively, the stable combustion region at the standard atmospheric pressure $P_0$ takes the form of an ellipse extending along a straight line (not shown) passing through the origin of the coordinate system at a gradient of about "1". This means that the ignition timing needs to be retarded as the injection timing is retarded. In FIG. 15, point $S_0$ represents optimum values for the injection timing and the ignition timing under the standard atmospheric pressure condition, taking individual differences of engines into consideration.

Thus, it is possible to experimentally obtain optimum injection timing and optimum ignition timing for achieving stable combustion in the compression stroke-lean mode. Accordingly, optimum injection timing and optimum ignition timing may be obtained in advance by experiment for each of target air-fuel ratios, and using the experimental data, target air-fuel ratios, target injection timings, target ignition timings, target EGR quantities (quantities of recirculated exhaust gas), etc. may be set based on the load value $P_e$.

At intake air pressures $P_1$ and $P_2$ ($P_0 > P_1 > P_2$) lower than the standard atmospheric pressure $P_0$, however, their stable combustion regions are smaller and more retarded as a whole than the stable combustion region at the standard atmospheric pressure, as indicated by the dashed line and the two-dot-chain line, respectively, in FIG. 15. These two stable combustion regions were obtained based on the results of test operations performed at the intake air pressures $P_1$ and $P_2$ in the same manner as in the case of the standard atmospheric pressure $P_0$.

As shown in FIG. 15, although the optimum injection and ignition timings (point $S_0$) at the standard atmospheric pressure $P_0$ are included in the stable combustion region at the intake air pressure $P_1$ (indicated by the dashed line in FIG. 15), they do not coincide with optimum values (point $S_1$) at the intake air pressure $P_1$. Also, the optimum values (point $S_0$) at the standard atmospheric pressure $P_0$ are outside the stable combustion region at the intake air pressure $P_2$ (indicated by the two-dot-chain line in FIG. 15) and naturally do not coincide with optimum values ($S_2$) at the intake air pressure $P_2$. Under the intake air pressure $P_2$ condition, therefore, stable combustion cannot even be achieved at the point $S_0$. Thus, the stable combustion region narrows with decrease in the intake air pressure (intake air density) presumably for the reason stated below.

The flow velocity of gas in the cylinder increases with reduction in the intake air density, and as the gas flow velocity increases, the time necessary for fuel to move from the injection valve to the vicinity of the spark plug shortens. Accordingly, where the injection timing is set so that fuel injected from the injection valve may reach the vicinity of the spark plug when the piston rises up to an appropriate position, if the time allowed for fuel to reach the vicinity of the spark plug is determined on the assumption that the intake air density is high (standard atmospheric pressure), fuel reaches the vicinity of the spark plug before the piston rises up to the appropriate position when fuel is injected at low intake air density at the set injection timing. In such a case, fuel is not concentrated around the spark plug (i.e., fuel is dispersed in the cylinder) and cannot be stratified satisfactorily, possibly causing failure in ignition. Therefore, when the intake air density is low, the injection timing needs to be retarded correspondingly. In addition, where the injection timing is retarded, the time for the atomization of fuel needs to be taken into account to stabilize the combustion, and also the ignition timing needs to be retarded correspondingly. Consequently, in low intake air density conditions, the ranges of injection timing and ignition timing in which stable combustion is achievable are both narrowed especially at the advance side.

Moreover, the quantity of fresh air decreases as the intake air density lowers. Accordingly, where the fuel supply quantity is set in accordance with the target air-fuel ratio set based on the target load value $P_e$ and the fresh air quantity (mass flow rate) introduced into the engine, the set fuel supply quantity reduces as the intake air density lowers. As the fuel supply quantity becomes smaller, the time period for which fuel remains concentrated in the vicinity of the spark plug shortens, and the range of injection timing in which stable combustion is achievable correspondingly narrows. Also, if the fuel supply quantity lessens, the fuel injection start timing is shifted (on the assumption that the injection end timing is fixed), and the time at which fuel reaches the vicinity of the spark plug is delayed, possibly necessitating corresponding retardation of the ignition timing.

Environmental parameter values correlated with the intake air density, such as the atmospheric pressure, intake air temperature and the like, greatly vary depending on whether the engine is operated at high altitudes or under the standard atmosphere. According to this embodiment, intake air density-based correction, which is grounded on the knowledge described below, is performed so that stable stratified combustion can be achieved with reliability even in cases where the environmental parameter values greatly differ from those at the standard atmosphere.

The stable combustion region indicated by the solid line in FIG. 15 is based on the results of experiment which was conducted by operating the engine under the standard atmosphere conditions, as mentioned above. In the experiment, the in-cylinder effective pressure had a nearly constant value of $P_{e0}$, and the optimum fuel injection timing and the optimum ignition timing found by the experiment are indicted by the point $S_0$ in the figure. The stable combustion regions indicated by the dashed line and the two-dot-chain line in FIG. 15 are based on the results of experiment conducted under the conditions of intake air pressures $P_1$ and $P_2$, respectively, and in-cylinder effective pressures (hereinafter referred to as equivalent effective pressures) corresponding to equivalent intake air flow rates obtained by converting the intake air flow rates under these intake air pressure conditions into equivalents under the standard atmospheric pressure condition are $P_{e1}$ and $P_{e2}$, respectively. In other words, the stable combustion region obtained experimentally at the intake air pressure $P_1$ or $P_2$ is considered to represent the stable combustion region at the equivalent effective pressure $P_{e1}$ or $P_{e2}$ under the standard atmospheric pressure condition. Namely, the stable combustion region at an equivalent effective pressure under the standard atmospheric pressure condition can presumably be obtained based on an experimentally obtained stable combustion region.

This proved to be true through further experimentation, as explained below.

The experiment was conducted by operating the engine with an air-fuel ratio of 30 under the standard atmospheric pressure, with the intake air reduced so that the in-cylinder effective pressure might be nearly equal to the value $P_{e1}$, and for a variety of ignition timing-injection timing combinations, whether stable combustion could be achieved or not was determined, to obtain a stable combustion region under these experimental conditions. The stable combustion region thus obtained is indicated by the solid line in FIG. 16.

Figure 16:
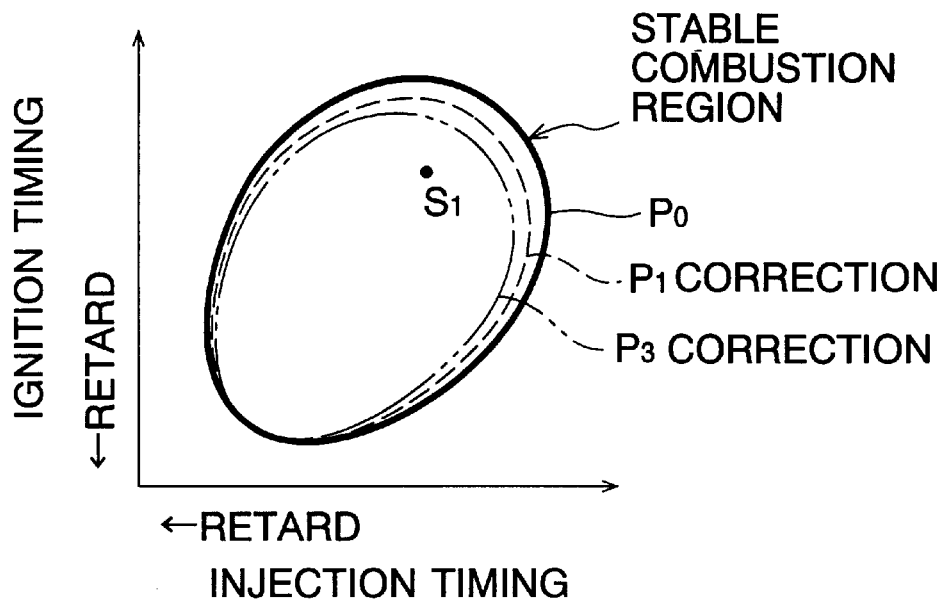
FIG. 16 is an injection timing-ignition timing operation map similar to FIG. 15, illustrating the case where the in-cylinder effective pressure is kept constant.

Further, the engine was operated with the intake air pressure set at a value $P_3$ ($P_0 > P_3 > P_1$) smaller than the standard atmospheric pressure $P_0$ and larger than the aforementioned intake air pressure $P_1$ and with the intake air reduced so that the equivalent effective pressure might be nearly equal to the value $P_{e1}$, and following the same procedure as described above, a stable combustion region indicated by the two-dot-chain line in FIG. 16 was obtained. A stable combustion region indicated by the dashed line in FIG. 16 is identical with that indicated by the dashed line in FIG. 15 and represents the stable combustion region obtained in the case where the intake air pressure was set at the value $P_1$ and the equivalent effective pressure was nearly equal to the value $P_{e1}$.

More generally, while setting up various conditions of constant in-cylinder effective pressure and constant air-fuel ratio, with the intake air pressure varied or with the intake air quantity reduced to different values, stable combustion regions under these conditions can be obtained.

As is clear from FIG. 16, where the in-cylinder effective pressure, corresponding to the equivalent intake air flow rate obtained by converting the intake air flow rate into an equivalent under the standard atmospheric pressure condition, is substantially the same, the stable combustion regions almost coincide with one another even for different intake air pressures (different atmospheric pressures), proving that optimum injection and ignition timings can be given by the point $S_1$.

From the knowledge stated above, it can be said that where the in-cylinder effective pressure is constant, the injection timing and the ignition timing may be set to respective substantially identical values. Accordingly, in this embodiment, the target load value, on the basis of which the engine control parameters are set, is corrected based on an environmental parameter value correlated with the intake air density, and the engine control parameters are set using the thus-corrected target load value so that stable stratified combustion may be achieved.

Specifically, in Step S22 in FIG. 12, the ECU 70 calculates a correction factor (reduction factor with reference to the standard atmosphere condition) $K_{at}$ for the atmosphere-based correction of the target mean effective pressure $P_{eB}$, according to the following equation (M3):

$$K_{at} = \alpha \times \gamma \quad (M3)$$

where $\alpha$ is a constant. The constant $\alpha$ is set to such a value that the correction factor $K_{at}$ takes the value "1" when the intake air density $\gamma$ is equal to a value given under the standard atmosphere condition. Consequently, as the intake air density $\gamma$ becomes smaller relative to the value under the standard atmosphere condition, the value of the correction factor $K_{at}$ reduces.

In Step S24, the target mean effective pressure $P_{ea}$ is subject to the atmosphere-based correction, according to equation (M4) below.

$$P_{ea} = K_{at} \times P_{eB} + \Delta P_e \quad (M4)$$

where $P_{ea}$ represents a target mean effective pressure after the atmosphere-based correction. Namely, the subscript "a" in the target mean effective pressure $P_{ea}$ indicates that the effective pressure has been subjected to ambient atmosphere-based correction. In the equation (M4), $K_{at}$, $P_{eB}$ and $\Delta P_e$ respectively denote the correction factor obtained in Step S22, the target mean effective pressure obtained in Step S12, and the auxiliary machinery-dependent correction value.

In this atmosphere-based correction, the target mean effective pressure $P_{eB}$ (which is set based on the throttle valve opening $\theta_{th}$ and the engine rotational speed $N_e$ and related to the intake air quantity) before the auxiliary machinery-based correction, which appears as the first term in the right side of the equation (M1) used in Step S14 for obtaining the target mean effective pressure $P_e$ subjected to the auxiliary machinery-based correction, is targeted for the atmosphere-based correction, while the auxiliary machinery-dependent correction value $\Delta P_e$ appearing as the second term in the right side of the equation (M1) is not targeted for the atmosphere-based correction. This is because the engine torque required to drive the auxiliary machinery such as an air conditioner does not change much, whether at low or high altitudes.

Then, in Steps S26 to S32, the ECU 70 corrects the target mean effective pressure based on the properties of fuel (octane number-based correction). This embodiment is based on the assumption that premium gasoline (e.g., of the octane number 98) and regular gasoline (e.g., of the octane number 90) are used as reference gasoline fuels. Other gasoline fuels than premium gasoline and regular gasoline may of course be used, and in such cases, the correction of the target mean effective pressure based on the properties of fuel is performed taking account of the properties of the fuel used. In the case where a gasoline fuel showing intermediate properties between premium gasoline and regular gasoline is used, for example, a knock learned value $K_L$, described later, is set, in the correction of the target mean effective pressure based on the properties of fuel, to a value such as to reflect the properties of the used fuel.

To correct the target mean effective pressure based on the properties of fuel, first, in Step S26, a torque difference value $dP_0$ is obtained. The torque difference value $dP_0$ represents a difference between the torque generated by the engine when premium gasoline is used and the torque generated by the engine when regular gasoline is used, the engine being operated under identical operating conditions. The torque difference value $dP_0$ can be obtained in the manner described below.

Figure 17:
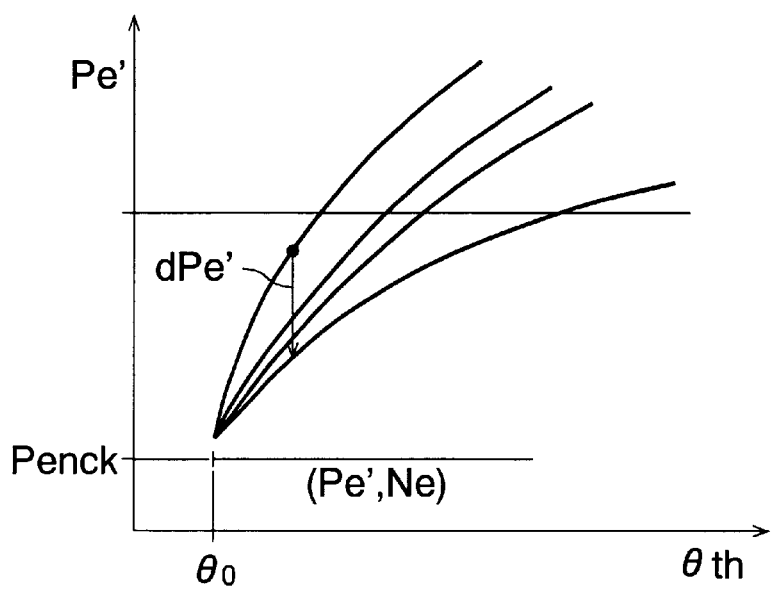
FIG. 17 is a diagram illustrating a procedure for obtaining regular difference value $dP_0$ based on throttle opening, target load $P_e'$, engine rotational speed $N_e$, etc.

In FIG. 17, four characteristic curves respectively indicate, as a function of the throttle opening $\theta_{th}$, a mean effective pressure attained when premium gasoline is used ($K_L = 1$), a mean effective pressure attained when regular gasoline is used ($K_L = 0$), and mean effective pressures attained when two other kinds of gasoline fuels ($0 < K_L < 1$) showing intermediate properties between premium gasoline and regular gasoline are used.

To obtain the torque difference value $dP_0$, first, a target mean effective pressure $P_e'$ for premium gasoline is obtained based on the premium gasoline-related characteristic curve shown in FIG. 17 and the throttle opening $\theta_{th}$, a target mean effective pressure $P_e'$ for regular gasoline is obtained based on the regular gasoline-related characteristic curve shown in FIG. 17 and the throttle opening $\theta_{th}$, and a difference $dP_e'$ between the two target mean effective pressures is obtained. Then, based on the effective pressure difference $dP_e'$ and the engine rotational speed $N_e$, the torque difference value $dP_0$ is obtained.

In practice, torque difference values $dP_0$ are stored in combination with each of the throttle opening $\theta_{th}$, the engine rotational speed $N_e$, etc. as a map in the storage device of the ECU 70, and an appropriate torque difference value $dP_0$ is read in accordance with the throttle opening value $\theta_{th}$, the engine rotational speed $N_e$, etc. detected as described above.

Figure 5:
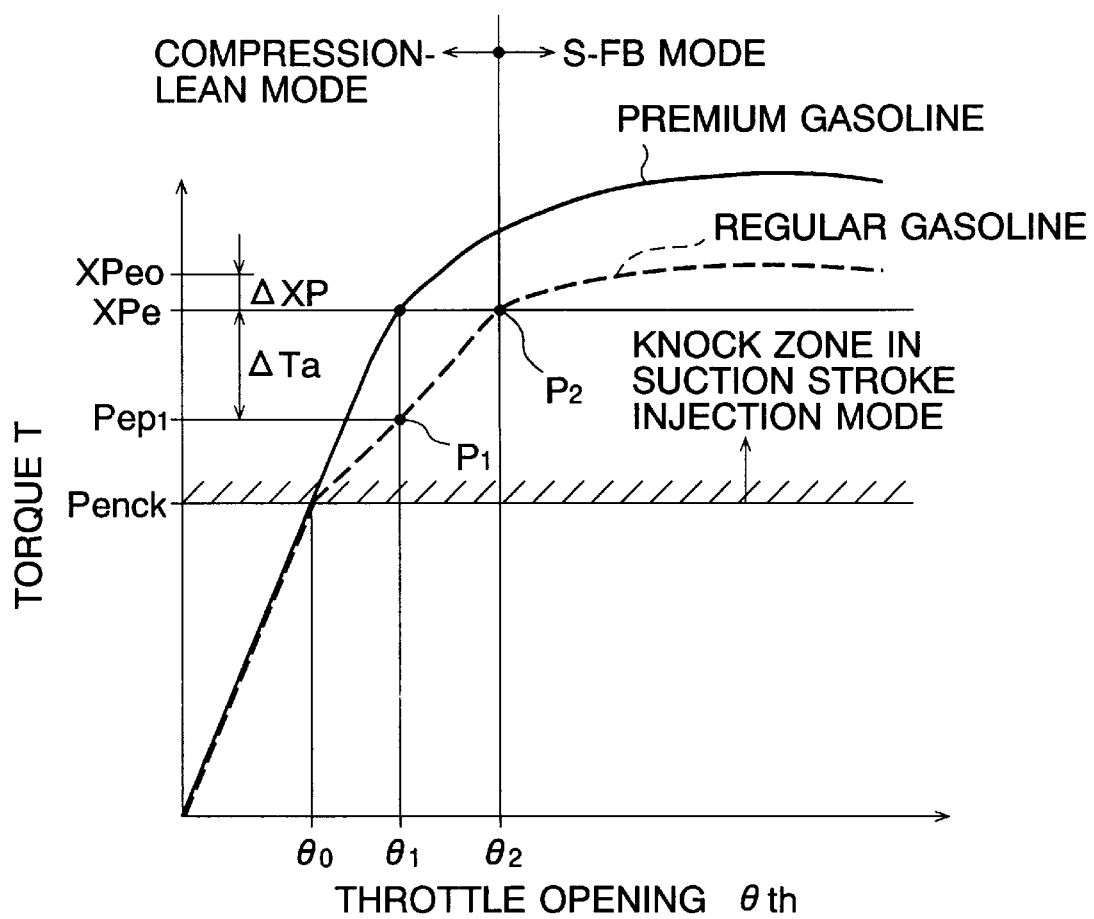
FIG. 5 is an operation characteristic diagram showing a torque-to-throttle opening relationship according to another embodiment of the present invention.

As seen from FIGS. 5 and 17, where regular gasoline is used, knocking can actually occur in the suction stroke injection mode in a region in which the target mean effective pressure $P_e$ is $P_{enck}$ or higher (region in which the throttle opening $\theta_{th}$ is $\theta_0$ or larger). When the throttle opening $\theta_{th}$ is $\theta_0$ or smaller, the torque difference value $dP_0$ is set to zero and no substantial octane number-based correction is performed.

Subsequently, the ECU 70 calculates a knock retard quantity $K_K$ and the knock learned value $K_L$ which serves as a state parameter value, based on the output signal of the knock sensor 38 (Step S28). The knock retard quantity $K_K$ represents the state of knocking (knock intensity) then occurring. The knock learned value $K_L$ is calculated based on the knock retard quantities $K_K$ successively obtained during a long term of operation, and represents a tendency to cause knocking during operation of the engine with fuel supplied thereto, that is, the properties (octane number etc.) of the fuel used. Accordingly, if the knock learned value $K_L$ is determined, then it is possible to detect the properties of the used fuel based on the value $K_L$. Methods of detecting the properties of fuel in this manner are disclosed in Unexamined Japanese Patent Publications No. 1-100349 and No. 60-104777, for example, and therefore, detailed description thereof is omitted.

After the knock learned value $K_L$ is determined, an octane number correction value dP is calculated (Step S30) according to equation (N1) below.

$$dP = dP_0 \times (K_{L98} - K_L)/(K_{L98} - K_{L90}) \tag{N1}$$

where $K_{L98}$ and $K_{L90}$ are knock learned values (fixed values) applied when premium gasoline and regular gasoline are used, respectively. In this embodiment, $K_{L98}$ is set to the value "1" and $K_{L90}$ is set to the value "0" ($dP = dP_0 \times (1-K_L)$).

In the subsequent Step S32, the target mean effective pressures $P_{ea}$ and $P_e$ are subjected to octane number-based correction, according to the following equations (N2) and (N3):

$$P_{eao} = P_{ea} - dP \tag{N2}$$

$$P_{eo} = P_e - dP \tag{N3}$$

In the equations, the subscript "o" in target mean effective pressures $P_{eao}$ and $P_{eo}$ indicate that the effective pressure has been subjected to the octane number-based correction.

In Step S34, a judgment threshold $XP_e$, which is used to determine whether the engine is to be controlled in the suction stroke injection mode or the compression stroke injection mode, is set in accordance with the engine rotational speed $N_e$. In FIG. 8, the boundary between the compression stroke injection-lean region indicated by hatching and the suction stroke injection region shows the relationship between the judgment threshold $XP_e$ and the engine rotational speed $N_e$. Accordingly, based on this relationship, the judgment threshold $XP_e$ corresponding to the engine rotational speed $N_e$ can be obtained.

Then, in Steps S36 and S38 in FIG. 13, it is determined whether or not the engine is to be controlled in the compression stroke injection mode. Specifically, in Step S36, the set judgment threshold $XP_e$ is compared with the target mean effective pressure $P_{eo}$ which has been subjected to the octane number-based correction and obtained in Step S32 according to the equation (N3), to determine whether or not the target mean effective pressure $P_{eo}$ is smaller than the judgment threshold $XP_e$. In Step S38, it is determined whether or not the engine is operated in a state in which engine control in the compression stroke injection mode should be inhibited, such as a state in which the warm-up is not yet completed.

In Step S36, $P_{eao}$, which has been subjected to the intake air density-based correction, is not used as the target mean effective pressure data to be compared with the judgment threshold $XP_e$ because, if $P_{eao}$ is used, the compression stroke injection-lean region improperly expands, possibly causing generation of smoke etc.

If the target mean effective pressure $P_{eo}$ is higher than or equal to the judgment threshold $XP_e$ and thus the result of decision in Step S36 is negative (No), or if the engine is operated in a state, in which engine control in the compression stroke injection mode should be inhibited and thus the result of decision in Step S38 is affirmative (Yes), the flow proceeds to Step S44, in which various engine control parameter values for the suction stroke injection mode are calculated. On the other hand, if the result of decision in Step S36 is affirmative and at the same time the result of decision in Step S38 is negative, the flow proceeds to Step S40 and various engine control parameter values for the compression stroke injection mode are calculated.

In Step S44 for calculating various engine control parameter values for the suction stroke injection mode, fuel injection end timing $T_{end}$, ignition timing $T_{ig}$, target air-fuel ratio AF and EGR quantity (opening $L_{egr}$ of the EGR valve 45) are set in accordance with the charging efficiency $\eta_v$ and the engine rotational speed $N_e$. In the suction stroke injection mode, the engine output can be determined substantially determinately based on the quantity of air flowing into the cylinder, as mentioned above, and therefore, this embodiment uses the charging efficiency $\eta_v$ obtained by subjecting the volumetric efficiency $E_v$ to the intake air density-based correction. To set the engine control parameter values based on the charging efficiency $\eta_v$ and the engine rotational speed $N_e$, an appropriate value may be read from a map in accordance with the charging efficiency $\eta_v$ and the engine rotational speed $N_e$, as in the case of calculating the target mean effective pressure $P_{eB}$ in Step S12. In this embodiment, the charging efficiency $\eta_v$, which has been corrected based on the intake air density $\gamma$, is used in place of the volumetric efficiency $E_v$ to calculate the engine control parameter values, and this permits optimum engine control parameter values to be set in accordance with the intake air density even under atmospheric conditions of low intake air density, such as at high altitudes. For the ignition timing $T_{ig}$ as an engine output control parameter correlated with the degree of occurrence of knocking, optimum ignition timing corresponding to the occurrence of knocking and the properties of fuel is set based on the knock retard quantity $K_K$, which is an instantaneous correction value, and the knock learned value $K_L$, a long-term learned correction value, in addition to the aforementioned charging efficiency $\eta_v$ and engine rotational speed $N_e$. Namely, the function of an engine output control parameter setting means is performed.

The valve opening of the ABV 27, however, is calculated in accordance with the target mean effective pressure $P_{eo}$ and the engine rotational speed $N_e$ even in the suction stroke injection mode (Step S46). When the ABV 27 is in a fully open state, the engine 1 can be supplied with a quantity of air comparable to that introduced through the fully open throttle valve 28, through the bypass passage 26. Thus, in cases where the engine output is smaller than required and the throttle valve 28 is opened by the driver, if the valve opening of the ABV 27 is controlled by using the volumetric efficiency $E_v$ or the charging efficiency $\eta_v$, the ABV 27 also is driven in the valve opening direction. Since even such slight correction in the valve opening direction can cause flow of intake air in quantity, an excessive quantity of air flows into the cylinder, possibly deteriorating the combustion. If the combustion deteriorates, the output becomes more deficient and the driver will further increase the opening of the throttle valve 28, with the result that the valve opening of the ABV 27 is increased. If the throttle operation and the operation of the ABV 27 take place circularly in this matter, the control can undergo divergent instability. Therefore, in this embodiment, the valve opening of the ABV 27 is set based on the throttle opening $\theta_{th}$, that is, the target mean effective pressure $P_{eo}$ set in accordance with the output requested by the driver, and the engine rotational speed $N_e$, as described above, whereby the control can be stabilized.

On the other hand, in Step S40 for calculating various engine control parameter values for the compression stroke injection mode, first, fuel injection end timing $T_{end}$ and ignition timing $T_{ig}$ are set in accordance with the target mean effective pressure $P_{eao}$, the engine rotational speed $N_e$, and the knock learned value $K_L$. In this case, the fuel injection end timing $T_{end}$ and the ignition timing $T_{ig}$ may each be read from a three-dimensional map, as in the case of calculating the target mean effective pressure $P_{eB}$ in Step S12. The target mean effective pressure $P_{eao}$, on the basis of which the fuel injection end timing $T_{end}$ and the ignition timing $T_{ig}$ are set, has already been subjected to the atmosphere-based correction (as well as to the octane number-based correction) in Step S24. For this reason and also for the reason stated above with reference to FIG. 16, the fuel injection end timing $T_{end}$ and the ignition timing $T_{ig}$ may be each obtained from the map prepared for the standard atmosphere condition. It is, therefore, unnecessary to read the fuel injection end timing $T_{end}$ or the ignition timing $T_{ig}$ from different maps depending on the intake air density, whereby the control is simplified and the number of bench tests performed for matching can be reduced.

Subsequently, in Step S42, target air-fuel ratio AF, EGR quantity (opening $L_{egr}$ of the EGR valve 45) and valve opening of the ABV 27 are set in accordance with the target mean effective pressure $P_{eo}$ and the engine rotational speed $N_e$. These engine control parameter values are set by using the target mean effective pressure $P_{eo}$ which is calculated in Steps S14 and S32 and which has not been subjected to the atmosphere-based correction. As mentioned above, in the compression stroke injection mode, the engine output cannot be determined based solely on the intake air quantity, and an engine output nearly proportional to the fuel supply quantity is obtained. Also, since the fuel injection end timing $T_{end}$ and the ignition timing $T_{ig}$ need to be set to optimum values in order to ensure stable stratified combustion, the target mean effective pressure needs to be subjected to the atmosphere-based correction, but the target air-fuel ratio AF, the EGR quantity and the valve opening of the ABV 27 are control parameters directly relating to the engine output, rather than parameters having an influence upon stratified combustion. In order to achieve an engine output exactly as requested by the driver, on the other hand, the accelerator opening information based on the driver's operation needs to be accurately reflected in the target air-fuel ratio, the EGR quantity and the valve opening of the ABV. Accordingly, the target mean effective pressure $P_{eo}$, on the basis of which these control parameter values are set, needs to be subjected to octane number-based correction but not to atmosphere-based correction, and if the atmosphere-based correction is performed, the driver's demand will fail to be met and even disadvantages can arise.

To set the target air-fuel ratio AF, the EGR quantity and the valve opening of the ABV 27, parameter values thereof may be read from maps, as in the case of calculating the target mean effective pressure $P_{eB}$ in Step S12.

After these control parameter values are set, the flow proceeds to Step S48, in which valve opening time $T_{inj}$ for the fuel injection valves 4 is calculated according to equation (M5) below.

$$T_{inj}=K \times (Q_a \times \gamma / AF) \times (K_{wt} \times K_{af} \ldots) \times K_g + T_{DEC} \quad (M5)$$

where $K_{wt}, K_{af}, \ldots$ are various correction factors dependent on the engine water temperature $T_w$, etc. and set in accordance with the engine operating state, $K_g$ is a gain correction factor for the injection valves 4, $T_{DEC}$ is an ineffective time correction value set in accordance with the target mean effective pressure $P_{eo}$ and the engine rotational speed $N_e$, and K is a conversion factor for converting fuel quantity into valve opening time and is a constant.

Then, in Step S50, the fuel injection valves 4 are each driven at the timing determined based on the thus-calculated valve opening time $T_{inj}$ and the injection end timing $T_{end}$, to inject a required quantity of fuel into the corresponding combustion chamber 5. Also, the spark plug 3 ignites the air-fuel mixture at the timing determined based on the ignition timing $T_{ig}$, and the EGR valve 45 and the ABV 27 are opened to their respective set required openings.

In this manner, optimum fuel injection end timing $T_{end}$ and optimum ignition timing $T_{ig}$ can be obtained based on the target mean effective pressure $P_{eao}$ which has been subjected to the atmosphere- and octane number-based corrections, and stable stratified combustion can be reliably achieved by performing the fuel injection based on the optimum fuel injection end timing $T_{end}$ and the firing based on the optimum ignition timing $T_{ig}$. Also, the target air-fuel ratio etc. are calculated based on the target mean effective pressure $P_{eo}$ which has been subjected to the octane number-based correction.

Each time a crank angle signal is output from the crank angle sensor 17, the engine control parameter values are calculated in the above-described manner. Switching from the compression stroke injection mode to the suction stroke injection mode is carried out in the manner described below with reference to FIG. 5.

Figure 3:
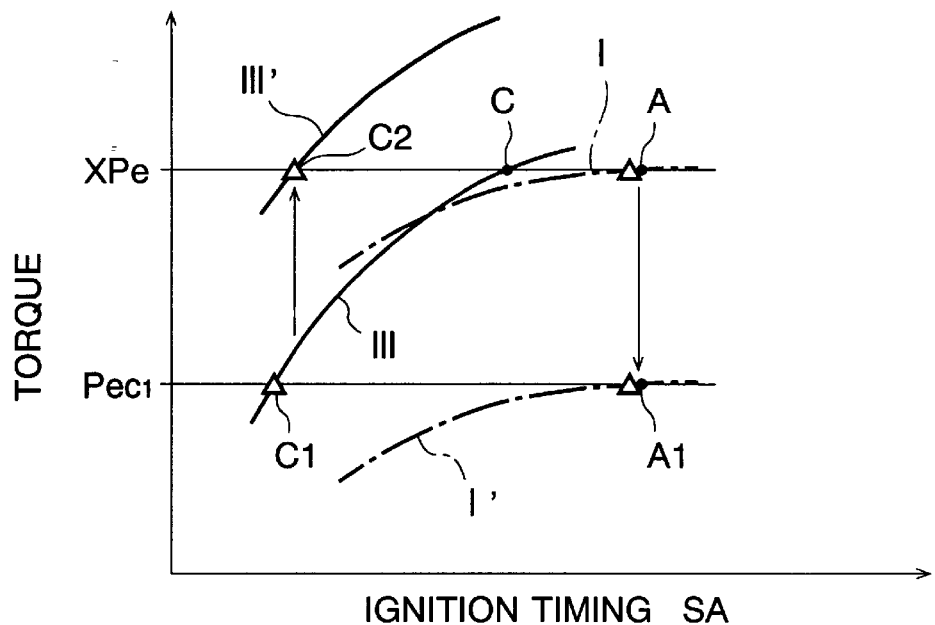
FIG. 3 is a graph showing the relationship between ignition timing and torque generated in individual modes when control modes are switched according to the present invention.

Before the throttle valve opening $\theta_{th}$ reaches the value $\theta_0$, the atmosphere-corrected target mean effective pressure $P_{ea}$ and the non-atmosphere-corrected target mean effective pressure $P_e$ are individually subjected to no substantial octane number-based correction ($P_{eao}=P_{ea}$ and $P_{eo}=P_e$), and therefore, the operation lines associated with premium gasoline and regular gasoline, respectively, are identical with each other. After the throttle opening $\theta_{th}$ exceeds the value $\theta_0$, substantial octane number-based correction is initiated in Step S32 and the target mean effective pressures $P_{ea}$ and $P_e$ are subjected to the octane number-based correction by means of the octane number correction value dP corresponding to the properties of fuel. According to this embodiment, the octane number correction value dP is set to the value "0" when premium gasoline is used, and to the value $dP_0$ when regular gasoline is used. Accordingly, the octane number-corrected target mean effective pressures $P_{eao}$ and $P_{eo}$ take the values $P_{ea}$ and $P_e$, respectively, when premium gasoline is used, and take the values $P_{ea}-dP_0$ and $P_e-dP_0$, respectively, when regular gasoline is used. In the throttle opening region of $\theta_0$ or above in which substantial octane number-based correction is executed, therefore, the torque generated when regular gasoline is used is smaller than that generated when premium gasoline is used. For example, when the throttle opening $\theta_{th}$ reaches the value 61 during use of premium gasoline, the octane number-corrected target mean effective pressure $P_{eo}$ ($=P_e$) reaches the mode switching judgment threshold $XP_e$, and as a result, switching from the compression-lean mode to the S-FB mode is effected. On the other hand, when regular gasoline is used, the torque generated at the point $P_1$ where the throttle opening $\theta_{th}$ reaches the value $\theta_1$ is smaller by a torque difference $\Delta T_a$ than the torque generated with the same throttle opening in the case where premium gasoline is used, and the octane number-corrected target mean effective pressure $P_{eo}$ takes a value $P_{ep1}$ ($P_{eo}<XP_e$) considerably smaller than the threshold $XP_e$. As a result, the compression-lean mode is continuously executed even after the throttle opening $\theta_{th}$ exceeds the value $\theta_1$, and reduced torque is generated. When the throttle opening $\theta_{th}$ reaches the value $\theta_2$ (point $P_2$), the target effective pressure $P_{eo}$ becomes equal to the judgment threshold $XP_e$, and at this point of time, switching from the compression-lean mode to the S-FB mode is executed. At the point $P_2$ where the throttle opening $\theta_{th}$ equals the value $\theta_2$, the charging efficiency $\eta_v$ is higher than that at the point $P_1$. Accordingly, upon entry into the S-FB mode following the mode switching, the ignition timing-torque characteristic shifts from the curve III to the curve III' shown in FIG. 3. By igniting the mixture at the ignition timing indicated by the point $C_2$ on the characteristic curve III', it is possible to produce torque corresponding to the mean effective pressure value $XP_e$. Consequently, no sudden torque change occurs at the time of mode switching, so that switching shock can be prevented.

A control apparatus according to a second embodiment of the present invention will be now described.

The second embodiment is characterized in that the threshold $XP_e$, which is used for the mode switching judgment, is subjected to octane number-based correction, and other control procedures, such as the settings of the engine control parameter values, are identical with those employed in the first embodiment.

Figure 18:
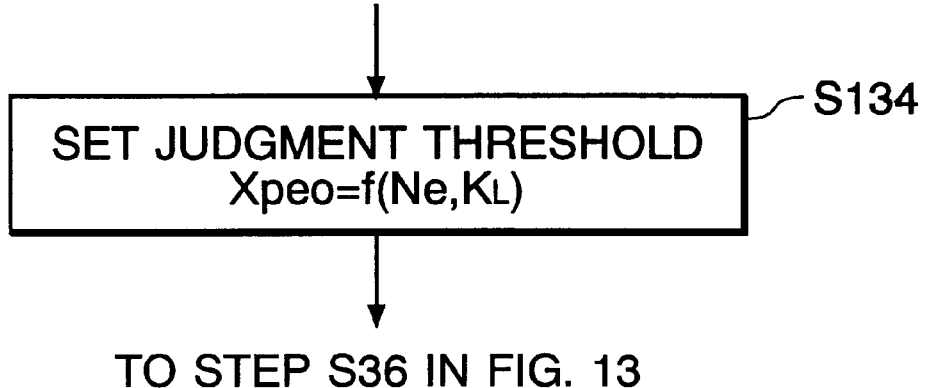
FIG. 18 is a flowchart showing part of an engine control routine executed by a control apparatus according to a second embodiment of the present invention.

More specifically, in this embodiment, an engine control routine almost identical with that shown in FIGS. 11 to 13 is executed. In this control routine, after the target mean effective pressure values $P_{ea}$ and $P_e$ are subject to the octane number-based correction in Step S32 in FIG. 12, the flow proceeds to Step S134 in FIG. 18 (corresponding to Step S34 in FIG. 12), in which the threshold for the mode switching judgment is obtained as a function of the engine rotational speed $N_e$ and the knock learned value $K_L$, thereby obtaining an octane number-corrected judgment threshold $XP_{eo}$. Then, Step S36 and the succeeding steps shown in FIG. 13 are successively executed.

The octane number-corrected judgment threshold $XP_{eo}$ can be obtained by various methods, and in this embodiment, the judgment threshold $XP_e$ is obtained following the same procedure as employed in the first embodiment, and then is subjected to octane number-based correction to obtain the threshold $XP_{eo}$. In this case, a correction value $\Delta XP$ corresponding to the knock learned value $K_L$ may be added to (see FIG. 5) or be multiplied by the judgment threshold $XP_e$ set based on the engine rotational speed $N_e$. Alternatively, the octane number-corrected judgment threshold $XP_{eo}$ may be read from a map in accordance with the engine rotational speed $N_e$ and the knock learned value $K_L$.

Where a fuel lower in octane number than premium gasoline is used, there occurs a load allowance during engine operation in the compression stroke injection mode, and thus it is desirable that the load allowance be reflected in the judgment threshold $XP_e$ by octane number-based correction. Since, according to this embodiment, the judgment of mode switching is made with the use of the octane number-corrected judgment threshold $XP_{eo}$ ($=XP_e+\Delta XP$), it is possible to expand the operation region, in which the engine is controlled in the compression stroke injection mode excellent in fuel efficiency characteristics, compared with the first embodiment, whereby the fuel efficiency can be improved.

A control apparatus according to a third embodiment of the present invention will be now described.

The third embodiment is characterized in that the target effective pressure $P_e$, which is not subjected to the octane number-based correction, in place of the octane number-corrected target effective pressure $P_{eo}$, is used for the judgment of mode switching, and other control procedures, such as the settings of the engine control parameter values, are identical with those employed in the first embodiment.

Figure 19:
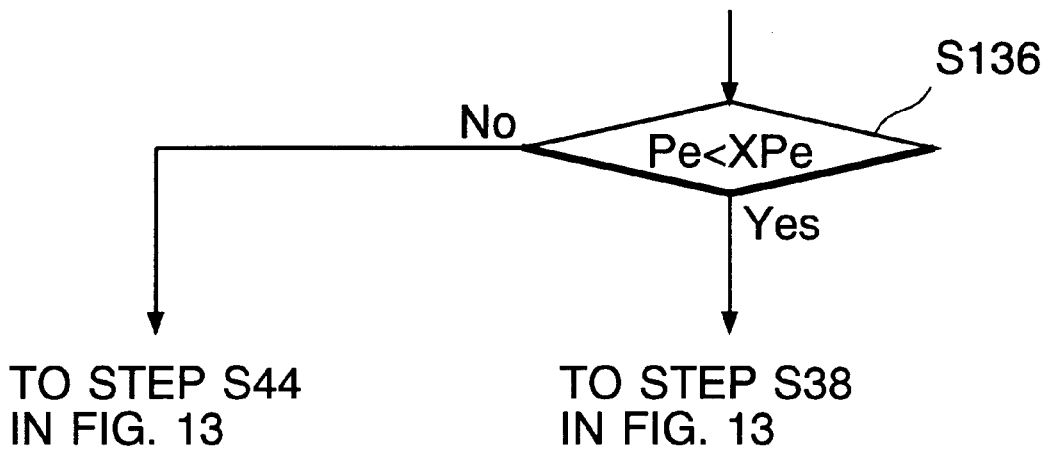
FIG. 19 is a flowchart showing part of an engine control routine executed by a control apparatus according to a third embodiment of the present invention.

More specifically, in this embodiment, an engine control routine almost identical with that shown in FIGS. 11 to 13 is executed. In this control routine, after the threshold $XP_e$ is set in Step S34 in FIG. 12, the flow proceeds to Step S136 in FIG. 19 (corresponding to Step S36 in FIG. 13) wherein it is determined whether or not the target effective pressure $P_e$, which is obtained in Step S14 in FIG. 11 and is not subjected to the octane number-based correction, is smaller than the judgment threshold $XP_e$. If the result of decision in Step S136 is affirmative, the flow proceeds to Step S38 in FIG. 13, and if it is judged in Step S38 that engine control in the compression stroke injection mode is not inhibited, Steps S40, S42, S48 and S50 are successively executed, whereby the engine control is performed in the compression stroke injection mode.

On the other hand, if the result of decision in Step S136 is negative, Steps S44, S46, S48 and S50 in FIG. 13 are successively executed and the engine control is performed in the suction stroke injection mode. Consequently, switching from the compression-lean mode to the S-FB mode is effected at the point of time (point A1 in FIG. 4) when the target effective pressure $P_e$ reaches the judgment threshold $XP_e$.

In the third embodiment, the fuel injection end timing $T_{end}$ and the ignition timing $T_{ig}$ are set in accordance with the target mean effective pressure $P_{eao}$, which has been corrected based on the atmospheric pressure and the octane number, the engine rotational speed $N_e$ and the knock learned value $K_L$ in Step S40 in FIG. 13, like the first embodiment. In Step S42, the target air-fuel ratio AF, the EGR quantity (valve opening $L_{egr}$ of the EGR valve 45) and the valve opening of the ABV 27 are set in accordance with the octane number-corrected target mean effective pressure $P_{eo}$ and the engine rotational speed $N_e$.

Figure 1:
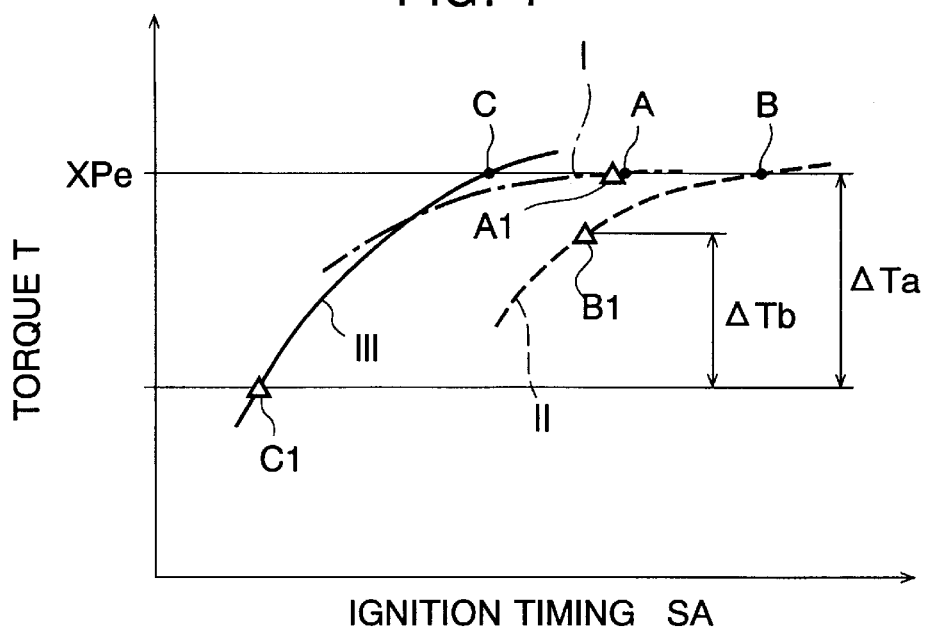
FIG. 1 is a graph showing the relationship between ignition timing and torque generated in individual modes when control modes of a cylinder-injection gasoline engine are switched.
Figure 2:
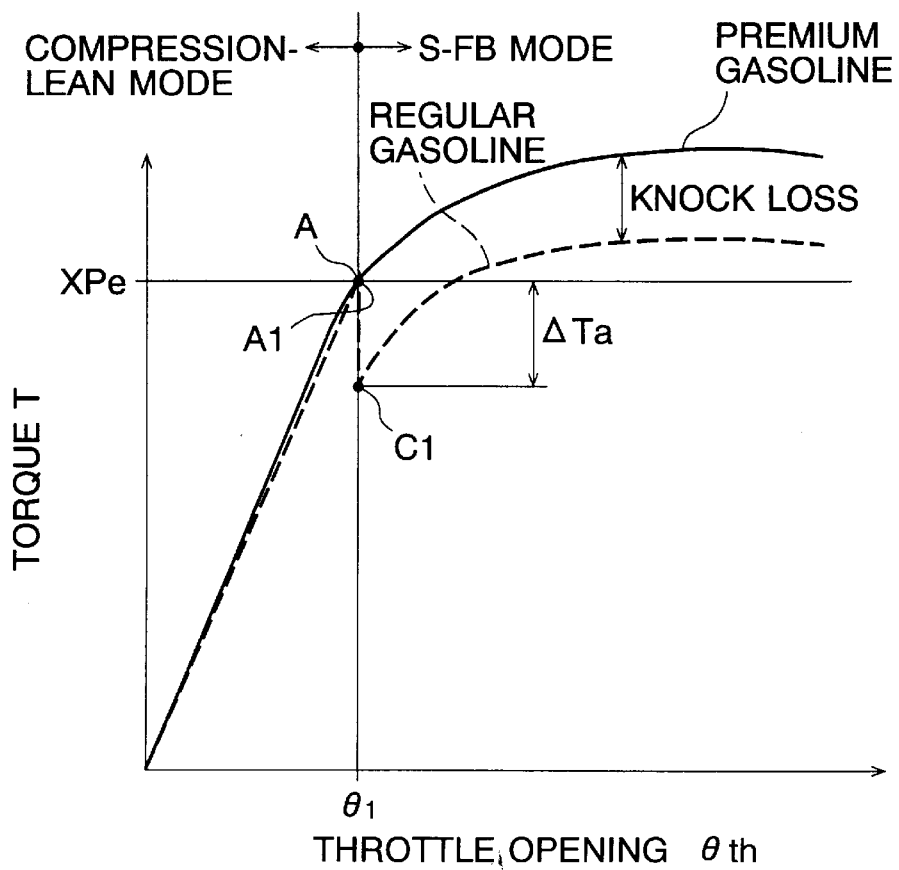
FIG. 2 is an operation characteristic diagram in which the relationship between torque and throttle opening is shown to explain inconvenience caused due to difference in property of fuel used when the control modes are switched.
Figure 4:
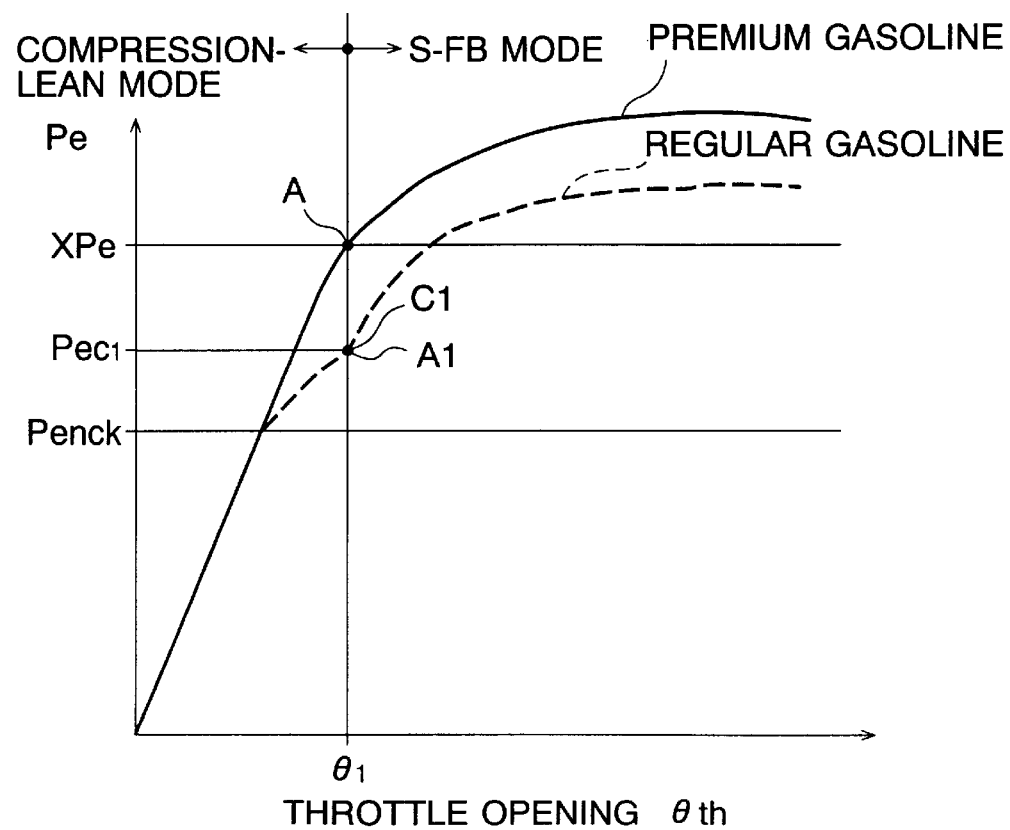
FIG. 4 is an operation characteristic diagram showing a torque-to-throttle opening relationship according to the present invention.

Accordingly, also in the third embodiment, before the throttle valve opening $\theta_{th}$ reaches the value $\theta_0$, no substantial octane number-based correction is carried out, and thus the octane number-corrected target effective pressures $P_{ea}$ and $P_e$ are respectively equal to the target effective pressures $P_{eao}$ and $P_{eo}$ which are not yet subjected to the octane number-based correction, as seen from FIG. 4. Consequently, the engine operation line associated with regular gasoline is identical with that associated with premium gasoline. When the throttle opening $\theta_{th}$ exceeds the value $\theta_0$, substantial octane number-based correction is initiated, whereby the engine control is performed in accordance with the target mean effective pressures $P_{eao}$ and $P_{eo}$ which have been corrected by means of the correction value dP corresponding to the properties of fuel. The torque generated in this case is smaller by an amount corresponding to the octane number-based correction than that generated in a similar condition where premium gasoline is used. When the throttle opening $\theta_{th}$ reaches the value $\theta_1$ (point A1 in FIG. 4), torque (corresponding to the effective pressure $P_{ec1}$)

smaller by the torque difference $\Delta T_a$ (FIG. 1) than that corresponding to the judgment threshold $XP_e$ is generated. Since the target effective pressure $P_e$, which is not subjected to the octane number-based correction, is used in making the judgment of mode switching, at this point of time the target effective pressure $P_e$ is equal to the judgment threshold $XP_e$ and switching from the compression-lean mode to the S-FB mode is effected. In the compression-lean mode applied immediately before the mode switching, the engine is operated along the characteristic curve I' in FIG. 3 with which the torque generated is smaller than that generated with the characteristic curve I. At the point A1 on the characteristic curve I', torque corresponding to the mean effective pressure value $P_{ec1}$ represented by the point A1 is generated by igniting the mixture at the ignition timing represented by the point A1. Immediately after the mode switching to the S-FB mode, on the other hand, torque corresponding to the mean effective pressure value $P_{ec1}$ is generated by igniting the mixture at the point C1 on the characteristic curve III shown in FIG. 3, and therefore, no sudden torque change occurs, thereby preventing a switching shock.

The third embodiment is inferior to the first and second embodiments in fuel efficiency characteristics but can advantageously prevent the occurrence of switching shock.

We claim:

1. A control apparatus for a cylinder-injection spark-ignition internal combustion engine having a fuel injection valve for injecting fuel directly into a combustion chamber thereof, said control apparatus being arranged to switch control mode of the internal combustion engine in accordance with an engine operating state between compression stroke injection mode control in which fuel is injected mainly during a compression stroke to achieve stratified combustion and suction stroke injection mode control in which fuel is injected mainly during a suction stroke to achieve uniform mixture combustion, comprising:

target load setting means for setting a target load value in accordance with accelerator opening information, which is based at least on driver's operation;

mode switching means for performing mode switching between the compression stroke injection mode control and the suction stroke injection mode control, based at least on the target load value;

parameter detecting means for detecting a state parameter value, which is related to one of a property of fuel supplied to the internal combustion engine or related to a degree of occurrence of knocking peculiar to the internal combustion engine;

engine output control parameter setting means for setting a parameter value for engine output control based on the target load value; and switching correction means for subjecting the mode switching to correction based on the detected state parameter value, to thereby compensate for an engine output change at the mode switching.

2. A control apparatus for a cylinder-injection spark-ignition internal combustion engine according to claim 1, wherein said mode switching means compares the target load value with a predetermined criterion value and carries out the mode switching in accordance with a comparison result, and said switching correction means corrects at least one of the target load value, the criterion value, and the engine output control parameter value for the compression stroke injection mode control.

3. A control apparatus for a cylinder-injection spark-ignition internal combustion engine according to claim 2, wherein said switching correction means corrects the target load value, said engine output control parameter setting means sets an engine output control parameter value for the compression stroke injection mode control, based on the corrected target load value, and said mode switching means carries out the mode switching in accordance with a result of comparison between the corrected target load value and the criterion value.

4. A control apparatus for a cylinder-injection spark-ignition internal combustion engine according to claim 2, wherein said switching correction means corrects the target load value and the criterion value, said engine output control parameter setting means sets an engine output control parameter value for the compression stroke injection mode control, based on the corrected target load value, and said mode switching means carries out the mode switching in accordance with a result of comparison between the corrected target load value and the corrected criterion value.

5. A control apparatus for a cylinder-injection spark-ignition internal combustion engine according to claim 2, wherein said switching correction means corrects the target load value, said engine output control parameter setting means sets an engine output control parameter value for the compression stroke injection mode control, based on the corrected target load value, and said mode switching means carries out the mode switching in accordance with a result of comparison between the non-corrected target load value and the criterion value.

6. A control apparatus for a cylinder-injection spark-ignition internal combustion engine according to claim 1, wherein said switching correction means subjects the mode switching to the correction based on the detected state parameter value, to correct the engine output control parameter on a compression-stroke-injection mode side at the torque generated at a mode switching point on a suction-stroke-injection side.

* * * * *